(12) United States Patent  
Ionescu et al.

(10) Patent No.: US 12,131,630 B2  
(45) Date of Patent: Oct. 29, 2024

(54) METHODS AND SYSTEMS FOR GENERATING TRAFFIC VOLUME DATA

(71) Applicants: TomTom Traffic B.V., Amsterdam (NL); TomTom Navigation B.V., Amsterdam (NL)

(72) Inventors: Lucian Ionescu, Berlin (DE); Sören Sven Sonnenburg, Berlin (DE); Przemyslaw Polewski, Schonefeld (DE); Heiko Mund, Hildesheim (DE)

(73) Assignees: TomTom Navigation B.V., Amsterdam (NL); TomTom Traffic B.V., Amsterdam (NL)

( * ) Notice: Subject to any disclaimer, the term of this patent is extended or adjusted under 35 U.S.C. 154(b) by 220 days.

(21) Appl. No.: 17/786,936

(22) PCT Filed: Dec. 21, 2020

(86) PCT No.: PCT/EP2020/087540  
§ 371 (c)(1),  
(2) Date: Jun. 17, 2022

(87) PCT Pub. No.: WO2021/123453  
PCT Pub. Date: Jun. 24, 2021

(65) Prior Publication Data  
US 2023/0343209 A1    Oct. 26, 2023

(30) Foreign Application Priority Data  
Dec. 19, 2019    (GB) ...................................... 1918833

(51) Int. Cl.  
*G08G 1/01*      (2006.01)  
*G08G 1/065*    (2006.01)

(52) U.S. Cl.  
CPC ......... *G08G 1/0141* (2013.01); *G08G 1/0112* (2013.01); *G08G 1/0129* (2013.01); *G08G 1/065* (2013.01)

(58) Field of Classification Search  
CPC .............. G08G 1/0141; G08G 1/0112; G08G 1/0129; G08G 1/065; G08G 1/0116; H04W 4/44  
(Continued)

(56) References Cited

U.S. PATENT DOCUMENTS 6,577,946 B2 *    6/2003   Myr ..................... G08G 1/0104  
                                                                                   701/117  
7,421,334 B2 *    9/2008   Dahlgren ........... G01C 21/3691  
                                                                                   701/408

(Continued)

FOREIGN PATENT DOCUMENTS

CN         102157070 A      8/2011  
JP         2005122461 A     5/2005  
(Continued)

OTHER PUBLICATIONS

International Search Report dated Apr. 19, 2021 for International patent application No. PCT/EP2020/087540.  
(Continued)

*Primary Examiner* — Jaime Figueroa  
(74) *Attorney, Agent, or Firm* — Park, Vaughan, Fleming, & Dowler LLP

(57) ABSTRACT

There is provided a method for generating traffic data indicative of a traffic volume and/or traffic density within a navigable network in an area covered by an electronic map, the electronic map comprising a plurality of segments representing navigable elements of the navigable network. The method generally comprises obtaining data indicative of a count of devices associated with vehicles traversing the navigable element represented by the segment in respect of  
(Continued)

a given time, wherein the count of devices is based on positional data and associated timing data relating to the movement of a plurality of devices associated with vehicles along the navigable element represented by the segment; and using the determined count data and an scaling coefficient to obtain data indicative of an estimated traffic volume for the segment in respect of the given time, wherein the scaling coefficient is time dependent.

28 Claims, 11 Drawing Sheets

(58) Field of Classification Search
USPC .................................................. 701/1, 118
See application file for complete search history.

(56) References Cited

U.S. PATENT DOCUMENTS

| | | | |
|---|---|---|---|
| 9,470,536 B2* | 10/2016 | Goldberg | G01C 21/20 |
| 10,223,911 B2* | 3/2019 | Modi | G06F 16/738 |
| 10,231,187 B1* | 3/2019 | Rubin | G08G 1/096791 |
| 10,767,999 B2* | 9/2020 | Kesting | G08G 1/0141 |
| 10,817,814 B2* | 10/2020 | Stefik | G06Q 10/063114 |
| 11,015,939 B2* | 5/2021 | Kesting | G08G 1/0112 |
| 11,151,494 B2* | 10/2021 | Singhal | G06Q 10/06313 |
| 2003/0014181 A1* | 1/2003 | Myr | G08G 1/20 340/934 |
| 2005/0065711 A1* | 3/2005 | Dahlgren | G08G 1/096775 701/117 |
| 2006/0082472 A1* | 4/2006 | Adachi | G08G 1/096775 340/995.13 |
| 2006/0122846 A1* | 6/2006 | Burr | G08G 1/096883 342/357.31 |
| 2007/0208501 A1* | 9/2007 | Downs | B60T 7/18 701/79 |
| 2008/0071465 A1* | 3/2008 | Chapman | G01C 21/3691 701/117 |
| 2011/0015851 A1* | 1/2011 | Burr | G08G 1/20 701/117 |
| 2012/0123659 A1* | 5/2012 | Sato | G08G 1/163 701/96 |
| 2012/0123667 A1* | 5/2012 | Gueziec | G08G 1/0133 701/119 |
| 2012/0173530 A1* | 7/2012 | Kurciska | G06F 16/29 707/738 |
| 2013/0197790 A1* | 8/2013 | Ouali | H04N 19/97 701/118 |
| 2013/0297211 A1* | 11/2013 | Burr | G08G 1/20 701/540 |
| 2014/0358414 A1* | 12/2014 | Ibrahim | G01C 21/10 701/119 |
| 2015/0253141 A1* | 9/2015 | Kesting | G01C 21/30 701/409 |
| 2015/0262477 A1* | 9/2015 | Fowe | G08G 1/096716 701/118 |
| 2015/0294563 A1 | 10/2015 | Krenaga et al. | |
| 2016/0040993 A1* | 2/2016 | Goldberg | G08G 1/0129 701/533 |
| 2016/0069695 A1* | 3/2016 | Broadbent | G01C 21/3667 701/411 |
| 2017/0061787 A1* | 3/2017 | Lorkowski | G08G 1/0112 |
| 2017/0076594 A1* | 3/2017 | Scofield | H04W 4/029 |
| 2017/0243485 A1* | 8/2017 | Rubin | H04W 4/46 |
| 2017/0256162 A1* | 9/2017 | Schilling | G08G 1/0129 |
| 2018/0060775 A1* | 3/2018 | Singhal | G06Q 10/06313 |
| 2018/0060790 A1* | 3/2018 | Stefik | G06Q 10/063116 |
| 2018/0122231 A1* | 5/2018 | Modi | G06F 16/444 |
| 2018/0202816 A1* | 7/2018 | Kesting | G08G 1/012 |
| 2018/0209797 A1* | 7/2018 | Kesting | G08G 1/0112 |
| 2018/0249066 A1* | 8/2018 | Katsumata | B60R 1/26 |
| 2020/0317200 A1* | 10/2020 | Elgie | B60W 30/143 |

FOREIGN PATENT DOCUMENTS

| | | |
|---|---|---|
| JP | 2011060019 A | 3/2011 |
| JP | 2011096004 A | 5/2011 |
| JP | 2013234922 A | 11/2013 |
| JP | 2016177638 A | 10/2016 |
| WO | 2015134434 A1 | 9/2015 |
| WO | 2019158438 A1 | 8/2019 |

OTHER PUBLICATIONS

Search Report dated May 20, 2020 for GB application No. 1918833.3.

* cited by examiner

METHODS AND SYSTEMS FOR GENERATING TRAFFIC VOLUME DATA

FIELD

The described embodiments relate to methods and systems for generating data indicative of traffic volume within a navigable network. The navigable network is in an area covered by an electronic map, the electronic map comprising a plurality of segments representing navigable elements of the navigable network.

BACKGROUND

Traffic volume (also referred to as traffic 'flow') is a measure of the number of vehicles passing through a given cross section of a navigable element e.g. roadway in a specified period of time.

Traffic volume is an important parameter for determining the average speed of travel (or conversely traversal time) associated with a road element of a road network. Average speeds of travel (or traversal times) associated with different road elements of a road network may be taken into account when planning a route through the road network. For example, each road element of a navigable network may be represented by a road segment of an electronic map. A fastest route through the navigable network may then be planned using average speed (or traversal time) data associated with the road segments e.g. using an appropriate cost function. Likewise, average speed of travel data may be used in determining an accurate time of arrival for a route. The more accurate the traffic volume data that can be obtained in relation to road elements of the road network, the greater the accuracy with which fastest routes and/or estimated times of arrival may be determined.

As well as being of importance in the navigation context, traffic volume is in general an important quantity for characterising the state of the traffic within a road network. Having knowledge of such traffic data may thus be highly beneficial for traffic management and control purposes. For instance, along with traffic speed, the traffic volume is a key parameter for many traffic management and control applications. In general, traffic volume data may be used for various applications to give more complete operational performance measures. For example, traffic volume data can provide insight into the real-time flow through the network that may be useful for monitoring major events or incidents occurring within the network, including monitoring the impact of traveller information on diversion routes (which are typically not equipped with traffic monitoring systems). As another example, traffic volume data may be used for determining traffic demand patterns e.g. for calibration and validation of traffic light signal patterns. The traffic volume data can also be used for estimating road capacities e.g. for use in traffic planning models. As yet another example, combining the traffic volume data with data reporting the delay (or costs) caused by traffic congestion may allow the costs of transportation to be estimated.

Traditionally traffic volumes have been measured by directly counting the number of vehicles at a certain location within the road network, using either manual or automatic counting methods. Automatic counting may be performed by employing various sensors at desired locations within the road network. For instance, it is known to use video or radar sensors to automatically count vehicles passing through a given cross section of a roadway, although the most widely used technique for automatic counting relies on inductive sensing (e.g. wherein inductive loop sensors are embedded into the road network). These types of sensors may be expensive to install and maintain and their availability varies widely from location to location. Such direct counting methods may thus provide accurate data but cannot easily be scaled to offer wider coverage of a road network.

FIG. 9 shows a map area comprising road segments. Highways are shown in a darker grey. The figure also indicates locations of induction loops on the highways (dark spots 500 on the highways). Road segments that are not highways generally do not have induction loops. These road segments are shown in light grey or using a single grey line. This illustrates that only a small fraction of road segments are equipped with traffic flow detectors.

Map data for use by navigation applications is specially designed to be used by route guidance algorithms, typically using location data from a positioning e.g. GPS or GNSS system. For example, roads can be described as lines, i.e. vectors (e.g. start point, end point, direction for a road, with an entire road being made up of many hundreds of such segments, each uniquely defined by start point/end point direction parameters). A map is then a set of such road vectors, data associated with each vector (speed limit, travel direction, etc), plus points of interest (POIs), plus road names, plus other geographic features like park boundaries, river boundaries, etc, all of which are defined in terms of vectors. All map features (e.g. road vectors, POIs, etc.) are typically defined in a co-ordinate system that corresponds with or relates to the co-ordinate system of the positioning system e.g. GPS system, enabling a position as determined through the positioning system to be located onto the relevant road shown in a map and for an optimal route to be planned to a destination.

Within a given road network, a certain number of vehicles are associated with devices including position detecting means (such as a GPS device). Such devices may transmit positional data indicative of their position, and hence that of the vehicle, with respect to time. Such data may be referred to as "probe data", or more specifically "vehicle probe data". Another term commonly used for such data is "floating car data". Each device (or vehicle) may be referred to as a "probe".

The probe data transmitted by devices associated with vehicles therefore provides an indication of the movement of vehicles through the network. In some embodiments, the devices associated with vehicles that transmit probe data may be devices running navigation applications. Such a device may be referred to as a "navigation device". Such navigation devices, may for example, include dedicated navigation devices or any mobile device on which a suitable navigation application is executed (e.g. a mobile phone, tablet or wearable device, such as a watch), or may be implemented using an integrated in-vehicle navigation system. However, probe data may include positional data obtained from any device associated with a vehicle, and having position determining capability. For example, the device may comprise means for accessing and receiving information from WiFi access points or cellular communication networks, such as a GSM device, and using this information to determine its location. Typically, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, wearable devices with positioning capability, position sensors, etc. For example, a navigation application may cause a device running the application to periodically sample at least a current position of the device. Such a sample of positional data may be referred to as a "probe" data sample. The probe data sample includes at least the position of the device and may comprise data indicative of the time to which the position relates.

Optionally other data may be included in a probe data sample. For example, a probe data sample may include a latitude coordinate value, longitude coordinate value and time value, and optionally additional information such as one or more of; a bearing, speed of travel, altitude etc. The device is arranged to transmit the probe sample data to a server.

Such samples of positional data i.e. probe data samples may be collected by a server from multiple devices traversing navigable elements of a navigable network in a geographic area. The navigable elements may be represented by segments of an electronic map. The devices may be associated with vehicles traversing the element of the network. The probe data samples obtained from a given device are indicative of the path travelled by the particular device.

Techniques have been proposed for determining traffic volume using probe data. Such techniques are advantageous, in that traffic volume data may be obtained for any segment of interest without the cost and lack of flexibility associated with traditional techniques using a fixed infrastructure of sensors. However, typically probe data is only collected from a fraction of the total vehicle fleet. A penetration level may be defined as being the proportion of vehicles from which probe data is collected. The penetration level may also be referred to as penetration rate, sample fraction, the (equipment) degree, or the (relative) percentage (degree). For consistency, the term "penetration level" will be used herein. Currently, the percentage of vehicles for which data is collected (i.e. the 'penetration level') is only of the order of about 10%, and even less in some areas. The low penetration rate and potentially uneven sampling rate means that traffic volumes normally are not (and cannot be) determined directly from probe data.

An electronic map comprises a plurality of segments representing navigable elements (e.g. road elements) of a navigable network (e.g. road network). Traffic volume for a segment of an electronic map may be estimated using a count of traversals of the element represented by the segment s by devices associated with vehicles at a time t as indicated by probe data (i.e. a count of probes traversing the segment at the relevant time), and a scaling coefficient.

Thus:

$$Y(s,t) = kX(s,t) \qquad \text{(Equation 1)}$$

where:
- $Y(s,t)$ is traffic volume for a (directed) road segment s at a time t;
- $X(s,t)$ is the count of traversals of the navigable element represented by the segment of the electronic map by devices associated with vehicles based on obtained positional data relating to the movement of the devices (i.e. the probe count) at the time t; and
- k is a scaling coefficient.

The scaling coefficient is indicative of the penetration level, and in this example is the inverse of penetration level.

To simplify notation, the time t may be expressed in time units of an aggregation time interval $\Delta t$. For example, in one such system, using an hour as $\Delta t$, the time t is an hourly time indicator (t has an accuracy of 1 hour).

The scaling coefficient k is therefore used to project a probe count associated with a segment for a given time (e.g. aggregation time interval) to a traffic volume for the segment in respect of the given time. It will be seen that the coefficient k (and accordingly the penetration level $\theta$) are critical to the ability to accurately perform this projection.

For ease of reference, properties such as traffic volume, measured traffic volume or count of traversals, whether measured or according to probe data, may be referred to herein in relation to the navigable segment e.g. road segment of the electronic map representing the navigable element e.g. road element of the navigable network e.g. road network to which they relate. Where not explicitly stated, it will be understood that such properties e.g. the traffic volume or count etc. are indicative of the corresponding properties of the navigable element in the real-world represented by the segment.

Traffic flow detectors, such as induction loops, may be used to directly measure a count of vehicles along a navigable element. The measured total traffic volume for a given navigable segment s at a time t is expressed as $Y(s,t)$. The total traffic volume $Y(s,t)$ for a segment may be obtained corresponding to the measured count of vehicles passing along the road element represented by the segment at the relevant time e.g. in the relevant aggregation time interval. This sensed or measured traffic volume may be used to estimate a scaling coefficient k which enables the traffic volume to be projected from the probe count for the segment at the relevant time. In other words, the measured count of vehicles serves as ground truth from which the coefficient k can be estimated directly by comparing the measured count to the sample probe count $X(s,t)$ in respect of the same time t. As mentioned above, to simplify notation the time t may be expressed in time units of $\Delta t$, e.g. using an hour as $\Delta t$ the time t is an hourly time indicator (t has an accuracy of 1 hour).

A common technique is to use traffic flow detectors to determine a constant scaling coefficient indicative of penetration level e.g. a coefficient k which is an inverse of penetration level. Although it is a commonly used approach to use a constant coefficient k, the Applicant has recognised that this may introduce errors as the penetration level varies between different times of day and/or different road segments.

To illustrate this problem, an experiment was performed using two sets of induction loops. The first set of induction loops resulted in a coefficient k=5.68 ($\theta$=17.6%). Using this result to analyse the second set of induction loops resulted in a mean relative prediction error (MRE) of 12.9%. The observed error between the estimated actual traffic flow $kX(s,t)$ and the measured traffic flow $Y(s,t)$, both for the second set of induction loops, is shown in FIG. 10.

The figure shows the error distribution as determined using the observed probe data and induction loop data for the second set. The error distribution shows that there is a need for a better method for estimating the coefficient used to obtain a total traffic volume from probe data.

WO2019/158438 A1 entitled "Methods and Systems for Generating Traffic Volume or Traffic Density Data" in the name of TomTom Traffic B.V., and published 22 Aug. 2019, describes a technique to estimate traffic volume for a road segment that uses the average speed of probes detected on the road segment and road segment parameters.

Another method for estimating traffic volumes using probe data is described in US 2015/0120174 A1 entitled "Traffic Volume Estimation" in the name of HERE Global B.V., and published 30 Apr. 2015. However, the method described in US 2015/0120174 A1 is still seen to suffer from various drawbacks.

Accordingly, the Applicant has realised that there remains a need for improved methods and systems for providing traffic volume data in respect of a navigable network based on probe data.

SUMMARY

In accordance with a first aspect of the described embodiments there is provided a method for generating traffic data indicative of traffic volume within a navigable network in an area covered by an electronic map, the electronic map comprising a plurality of segments representing navigable elements of the navigable network, the method comprising, for one or more segment of the electronic map:

obtaining data indicative of a count of devices associated with vehicles traversing the navigable element represented by the segment in respect of a given time, wherein the count of devices is based on positional data and associated timing data relating to the movement of a plurality of devices associated with vehicles along the navigable element represented by the segment; and using the determined count data and a scaling coefficient to obtain data indicative of an estimated traffic volume for the segment in respect of the given time, wherein the scaling coefficient is a time dependent scaling coefficient, and the method comprises using the scaling coefficient in respect of the given time in obtaining the estimated traffic volume for the segment.

Thus, in accordance with the described embodiments a count of devices associated with vehicles traversing a navigable element represented by a segment of the electronic map at a given time is obtained. The count is based on i.e. obtained using positional data and associated timing data relating to the movement of a plurality of devices associated with vehicles (i.e. vehicle probe data) along the navigable element represented by the segment. The count data is used together with a scaling coefficient to obtain an estimated traffic volume for the segment in respect of the given time. The estimated traffic volume is indicative of an estimated traffic volume for the navigable element represented by the segment in respect of the given time.

The method may be performed in relation to one or more segments, which may be referred to as segments of interest. Any of the steps described herein in relation to determining traffic volume and/or a scaling coefficient in respect of a segment (of interest) may be performed in relation to one or more additional segment of interest.

In accordance with the described embodiments, the scaling coefficient is a time dependent scaling coefficient. The scaling coefficient in respect of (i.e. applicable to) the given time is used in obtaining the estimated traffic volume. Thus, rather than using a scaling coefficient that is constant with respect to time, such that the same (value of the) scaling coefficient is used regardless of the time to which the required estimated traffic volume relates, the (value of the) scaling coefficient will vary, depending upon the time being considered.

The scaling coefficient is preferably an estimated i.e. calculated scaling coefficient, rather than being a measured such coefficient. The process of estimating an estimated scaling coefficient may, as described below, involve using measured data, however.

The scaling coefficient is used in estimating traffic volume for the segment. Traffic volume is a measure of the number of vehicles passing through a given cross section of a roadway in a specified period of time. So, in embodiments, to estimate traffic volume for a segment, the number of probe counts for a given time (e.g. within a given time interval) (i.e. the "sample volume") is determined, and the determined sample volume is scaled using an appropriate scaling coefficient to estimate the total traffic volume for that segment. The scaling coefficient is indicative of penetration rate e.g. inversely proportional thereto.

The given time (to which the count data and scaling coefficient and hence estimated traffic volume relate) is preferably a time interval. The time interval may be a recurrent time interval e.g. a given time interval on a given day of the week. In some embodiments, the given time is a time interval on a given day of the week.

The count of devices associated with vehicles traversing the navigable element represented by the segment in respect of the given time may be a count of such devices associated with vehicles traversing the navigable element at the given time e.g. in a given time interval.

In order to determine a count of devices or perform other operations using vehicle positional i.e. probe data, the positional data must be aggregated over a time interval. In embodiments in which the given time is a time interval, the time interval may be a time interval used in the aggregation of the positional data e.g. to obtain the count of devices traversing the navigable element. The time interval may be an aggregation time interval over which the positional data is aggregated in obtaining the count of devices. It will be appreciated that obtaining a count of devices traversing a navigable element represented by a segment will typically involve aggregating positional data relating to the movement of devices associated with vehicles i.e. probe data along the element over a window of time or "aggregation interval". Any device traversing the element in the aggregation interval will be counted in obtaining the count in respect of that aggregation interval. Where the aggregation time interval is a recurrent interval, such as an interval on a day of the week, probe data relating to traversals of the element on different weeks but in the same time interval on the same day of the week may be counted in respect of the time interval e.g. between 3 pm and 4 pm on a Tuesday.

The time interval may be of any desired size. Typically, traffic volumes are reported in vehicles per hour (or even vehicles per hour per lane for multi-lane roadways). In some embodiments the interval is a 1 hour interval. However, the size of the aggregation time interval may generally be selected as desired, e.g. depending on the application. For instance, for dynamic traffic phenomena such as traffic jams, where it may be desirable to report traffic volumes over relatively short intervals, the sample volumes may be aggregated over periods from about 1 minute up to about 1 hour. In other cases, such as for calibration of traffic light signals, or traffic planning, it may be desired to report traffic volumes over longer intervals.

The time interval may be one of a set of predefined time intervals. The time intervals are preferably regular time intervals. For example, the time interval may be one of a set of predefined time intervals obtained by dividing each day of the week into a predetermined unit of time. The unit of time may be a 1 hour unit, or a lesser unit, such as 10 minutes, or a greater unit, such as 20 minutes, if greater or lesser granularity is desired. Each time interval may be identified by a time index.

The given time (to which the count data and scaling coefficient and hence estimated traffic volume relate) may be obtained based upon an indicated time of interest. The method may comprise receiving data indicative of a segment of interest for which estimated traffic volume data is required and data indicative of a time of interest, and using the data indicative of the time of interest to identify the given time. The method may comprise using the data indicative of the segment of interest for which estimated traffic volume data is required and the data indicative of the time of interest to obtain the data indicative of the count of devices associated with vehicles traversing the navigable element represented by the segment in respect of the given time. In some embodiments in which the given time is a time interval, the data indicative of the time of interest may be used to identify a time interval in respect of which to obtain the count data. The time interval may be a time interval encompassing the time of interest.

The scaling coefficient is time dependent in that the applicable value of the scaling coefficient varies depending upon the time being considered e.g. upon the time for which the estimated traffic volume for a segment is required.

The method may further comprise obtaining the (value of the) scaling coefficient in respect of the given time to be used in obtaining the estimated traffic volume for the segment. The method may comprise selecting the scaling coefficient from a set of scaling coefficients, each scaling coefficient being in respect of a different time e.g. a different time interval. In other embodiments, the method comprises determining i.e. deriving the scaling coefficient in respect of the given time. Whether the method extends to the step of determining the scaling coefficient or not, the scaling coefficient is preferably an estimated scaling coefficient.

While it is envisaged that scaling coefficients may be derived and stored for subsequent used, such that obtaining an scaling coefficient simply involves looking up a suitable value applicable to a time of interest, the described embodiments enable a scaling coefficient to readily be derived e.g. using databases of probe data and measured vehicle count data relating to segments of an electronic map. Thus, advantageously, a scaling coefficient may be estimated as required e.g. in response to a request for estimated traffic volume. This may enable the most recent probe and measured count data to be taken into account. In some embodiments the scaling coefficient is determined i.e. derived on the fly.

Whether or not the method involves deriving the scaling coefficient, the scaling coefficient used is applicable to the given time for which the estimated traffic volume is required is used. Preferably the given time is a given time interval, and is one of a set of predefined time intervals (e.g. obtained by dividing each day of the week into a predetermined unit of time). Where the scaling coefficient forms part of a set of scaling coefficients, the set of scaling coefficients may be a predefined set of scaling coefficients. The set of scaling coefficients may comprise scaling coefficients in respect of each predefined time interval. It will be appreciated that to facilitate processing, the given time to which the scaling coefficient relates is preferably the same as the given time interval for which the estimated traffic volume data is required (and to which the count data relates). However, this need not necessarily be the case, provided that the scaling coefficient that is used is in respect of a time interval relevant to the given time e.g. including or included in a given time interval to which the count (and hence traffic volume) relates.

The method may comprise using received data indicative of the time of interest in obtaining the scaling coefficient to be used (which may involve deriving the coefficient or selecting the coefficient from a set of predefined coefficients).

In the described embodiments, a count of devices associated with vehicles traversing the segment is determined in respect of a plurality of different given times e.g. time intervals, and the determined count data and a respective scaling coefficient is used to obtain the estimated traffic volume for the segment in respect of each one of the plurality of different given times, wherein a different respective scaling coefficient is used in respect of each different given time.

The step of obtaining the data indicative of the count of devices based upon the position (i.e. probe) data obtained from devices associated with vehicles may simply involve looking up the applicable count of devices for the relevant segment and time. Thus, in some embodiments, the method comprises obtaining the count data from a database of counts of devices traversing navigable elements of the navigable network represented by segments of the electronic map in respect of different times e.g. time intervals. The time intervals may correspond to those used in the methods of the described embodiments, or the appropriate count data may be derived from count data in respect of other time intervals in the database (e.g. by summing count data for smaller time intervals). In other embodiments the method extends to the step of determining the count data.

In some embodiments the method comprises obtaining positional data relating to the movement of a plurality of devices associated with vehicles along the navigable element represented by the segment and associated timing data, and using the positional data and associated timing data to determine the count of devices associated with vehicles traversing the segment in respect of the given time. This may be performed using appropriate filtering of the positional data with respect to time. The count of devices may be obtained solely using positional data and associated timing data relating to the movement of devices associated with vehicles along the navigable element i.e. solely using probe data, and without the use of other forms of data e.g. obtained from sensors associated with the navigable element represented by the segment.

The scaling coefficient is indicative of a penetration level for the segment. For example, the scaling coefficient may be inversely related to penetration level.

The described embodiments thus recognise that the most appropriate value of the scaling coefficient for a segment will depend upon the time being considered. In other words, in order to be able to more accurately estimate traffic volume based on a count of traversals of a segment by vehicles according to probe data for the segment, it is necessary to take into account the time being considered. For a given segment, the scaling coefficient which most accurately projects a probe count to an estimated traffic volume may differ e.g. between parts of the day and/or between days of the week.

In accordance with the described embodiments, the time dependent scaling coefficient may be obtained in any suitable manner. The method may comprise obtaining the scaling coefficient in respect of the given time from a database of scaling coefficients in respect of different times. In other embodiments the method extends to the step of determining the scaling coefficient (or, in embodiments, set of scaling coefficients in respect of different times).

The scaling coefficient may be one of a set of scaling coefficients obtained or obtainable in respect of different times having values which form a continuum of values with respect to time, or may be one of a set of discrete scaling coefficients obtained or obtainable, each in respect of a different time (or time interval). For example, a set of discrete scaling coefficients may be provided, each in respect of a different time interval. The scaling coefficient may be obtained using a function that is time dependent. The function may be arranged to provide scaling coefficients for different times that form a continuum of values with respect to time, or a set of discrete values with respect to time.

Various techniques may be used to estimate a time dependent scaling coefficient. The techniques may be used to provide a set of such scaling coefficients in respect of different times.

The scaling coefficient may be determined i.e. derived using data indicative of a count of vehicles traversing one or more navigable elements represented by segments of the electronic map in respect of the given time as detected by at least one traffic detector associated with the element and a count of devices associated with vehicles traversing each such navigable element in respect of the given time as determined using positional data and associated timing data relating to the movement of a plurality of devices associated with vehicles along the navigable elements. Thus, a scaling coefficient for a segment for which both such data types exist may be derived based on a relationship between a count of vehicles traversing the element represented by the segment for a time (e.g. aggregation time interval) as determined using at least one traffic detector and as determined based on probe data. The scaling coefficient for a segment of interest may be based upon such data relating to the segment itself and/or such data relating to one or more reference segments. For simplicity, the time may correspond to the same time or time interval used in the determination of the count based on probe data for obtaining the estimated traffic volume, although other time intervals may be used, provided that the resulting scaling coefficient is relevant to the given time for which the estimated traffic volume is required e.g. included in or including that time interval. Thus, in a simple embodiment, the scaling coefficient might be a measured scaling coefficient obtained using probe and measured count data for a segment for which both such forms of data are available for the given time. This is in contrast to prior art arrangements in which a constant scaling coefficient is used, regardless of the time being considered. However, in some embodiments, the scaling coefficient is estimated using probe and measured count data relating to other segments.

Various possibilities may be envisaged in which a scaling coefficient for a segment of interest is derived for different times based on a comparison of traffic counts based on probe data and traffic detector data for at least some segments for which both types of data are available for different times. Such segments may include the segment of interest and/or a set of one or more reference segments. The described embodiments enable a scaling coefficient to be obtained for a segment of interest for which traffic detector data is unavailable, and thus, the segments used in determining the scaling coefficient may include a set of one or more reference segments and not the segment of interest. The scaling coefficient is then an estimated scaling coefficient. Some form of aggregation between different (reference) segments might be envisaged to obtain an overall scaling coefficient value for each time considered.

In some embodiments the scaling coefficient for the segment (of interest) is an estimated scaling coefficient and is estimated using data indicative of a similarity of a probe profile associated with the segment (of interest) to each one of one or more reference probe profiles, each reference probe profile being associated with a respective reference segment. A probe profile or reference probe profile in respect of a segment or reference segment as used herein refers to a profile indicative of a variation in a count of devices associated with vehicles traversing the navigable element represented by the segment or reference segment with respect to time as determined based on positional data and associated timing data relating to the movement of a plurality of devices associated with vehicles along the navigable element represented by the segment or reference segment.

The scaling coefficient may be estimated using data indicative of a similarity of the probe profile for the segment to each one of a plurality of reference probe profiles, each being associated with a different one of a plurality of reference segments. The scaling coefficient may be estimated using a set of similarity parameters indicative of a similarity of the probe profile for the segment to the reference probe profiles. The method may comprise the step of determining such a set of similarity parameters. The set of similarity parameters may include a similarity parameter indicative of a similarity of the probe profile for the segment to the reference probe profile in respect of each one of the reference probe profiles. The similarity parameters may be expressed using a predefined scale of similarity, which may be a continuum or comprise discrete levels.

The method may comprise using a kernel function to determine the data indicative of a similarity of the probe profile to a reference probe profile e.g. a similarity parameter. The kernel function may be a non-negative kernel function. The function may accept two vector arguments and output a single real number in a predefined range. The predefined range may correspond to a desired predefined range of similarity e.g. 0-1. The kernel function maps the similarity of two probe profiles to a real valued function result. The kernel function may be a radial basis function. The number may be taken to be the similarity parameter. Thus, in embodiments, the similarity profile is obtained using a kernel function.

Preferably the or each reference segment is a segment representing a navigable element associated with at least one traffic detector. Thus, in these embodiments, each reference segment is a segment for which traffic detector data is available (e.g. to a server performing the methods described herein). Such data enables a measured count of vehicles traversing the segment at a given time (i.e. in a given time interval) to be determined. A traffic detector may be any device or system which may detect the presence of a vehicle on the navigable element represented by the segment.

It will be appreciated that where measured traffic data for a segment is available, an accurate value of the scaling coefficient may be determined for a given time, based on a comparison of the measured count of vehicles traversing the segment in respect of that time and a count determined using probe data for the segment in respect of that time.

In embodiments, the scaling coefficient is estimated based upon a set of one or more reference scaling coefficients, each reference scaling coefficient being a scaling coefficient determined in respect of a respective one of the one or more reference segments in respect of the given time based on data obtained from the at least one traffic detector associated therewith.

The reference scaling coefficient may be determined using a count of devices associated with vehicles traversing the navigable element represented by the reference segment in respect of the given time based on positional data and associated timing data relating to the movement of a plurality of devices associated with vehicles along the navigable element represented by the reference segment, and a measured count of vehicles traversing the reference segment in respect of the given time as determined based on data measured by the at least one traffic detector associated with the reference segment. The reference scaling coefficient may be determined by dividing the measured count of vehicles by the count of vehicles determined using the positional data relating to the movement of the plurality of devices (i.e. using vehicle probe data).

The given time to which the data used in estimating the scaling coefficient relates is preferably a time interval e.g. an aggregation time interval. The given time preferably corresponds to the given time in respect of which the count of devices traversing the navigable element represented by the segment for which an estimated traffic volume is required is obtained and used to obtain data indicative of the estimated traffic volume of the segment in respect of the given time. However, this need not necessarily be the case, provided that the given time used in estimating the scaling coefficient results in an scaling coefficient that is applicable to the given time for which the estimated traffic volume is required e.g. that at least approximately corresponds to that given time e.g. time interval, e.g. overlaps or is included therein.

Preferably similarity data obtained as described in accordance with any of the techniques above is used together with the reference scaling coefficient data in deriving a scaling coefficient for the segment.

It may be assumed that the scaling coefficient for a segment of interest is more likely to be similar to the reference scaling coefficients associated with those reference segments having reference probe profiles more similar to the probe profile of the segment of interest. In embodiments the similarity data is used to determine a contribution of each reference scaling coefficient to the estimated scaling coefficient determined for the segment of interest. In other words, the similarity data may be used to weight the contribution of each reference scaling coefficient. The method may be performed such that a reference scaling coefficient associated with a reference segment having a reference probe profile more similar to the probe profile associated with the segment of interest provides a greater contribution to the estimated scaling coefficient than a reference scaling coefficient associated with a reference segment having a reference probe profile less similar to the probe profile associated with the segment of interest. The greater the similarity of the reference probe profile associated with a reference segment to the probe profile associated with the segment of interest, the greater the contribution of the reference scaling coefficient to the estimated scaling coefficient for the segment of interest.

However, regardless of whether the method of determining the scaling coefficient involves consideration of the similarity of a probe profile for a segment and one or more reference probe profiles, in general, the scaling coefficient for a segment may be based upon a set of one or more (and preferably a plurality of) reference scaling coefficients, each reference scaling coefficient being a scaling coefficient determined in respect of a set of one or more reference segments in respect of the given time using data obtained from at least one traffic detector associated therewith. Thus, in such embodiments, the or each reference segment is a segment representing a navigable element associated with at least one traffic detector. The set of one or more reference segments preferably corresponds to the set of reference segments for which probe profile similarity data is obtained in embodiments which obtain such data. Each reference scaling coefficient may provide a contribution to the estimated scaling coefficient.

In any embodiment using a reference scaling coefficient, the reference scaling coefficient may be determined using a count of devices associated with vehicles traversing the navigable element represented by the reference segment in respect of the given time based on positional data and associated timing data relating to the movement of a plurality of devices associated with vehicles along the navigable element represented by the reference segment, and a measured count of vehicles traversing the reference segment in respect of the given time as determined based on data measured by the at least one traffic detector associated with the reference segment. The reference scaling coefficient may be determined by dividing the measured count of vehicles by the count of vehicles determined using the positional data relating to the movement of the plurality of devices (i.e. using vehicle probe data).

Preferably the scaling coefficient (for the segment of interest) is based upon a set of a plurality of such reference scaling coefficients, and may be based upon a sum thereof.

It has been found that some reference segments may be of greater importance in deriving an accurate scaling coefficient for a segment than others. In embodiments using similarity data, this may be the case regardless of the similarity between the reference segment and the segment for which a scaling coefficient is required. Preferably, in any embodiment using reference scaling coefficients, the scaling coefficient for the segment (of interest) is based upon a weighted sum of the plurality of reference scaling coefficients.

One or more set of weighting values may be derived including weighting values in respect of each one of the set of reference segments, each weighting value indicative of the weight to be assigned to the reference scaling coefficient associated with the reference segment when determining a scaling coefficient in respect of a segment. The set of weighting values may be defined by a vector. The scaling coefficient for the segment may be obtained using such a set or sets of weighting values. A plurality of sets of weighting values may be obtained in respect of different factors affecting the contribution of a reference scaling coefficient to the overall estimated scaling coefficient for a segment. The overall contribution of a reference scaling coefficient may be based upon weighting values in respect of different factors e.g. similarity to the segment in question, and/or the results of implementing a linear regression training model.

The contribution of a given reference scaling coefficient to the estimated scaling coefficient for the segment (of interest) may be based at least in part upon the similarity of the reference probe profile associated with the reference segment with which the reference scaling coefficient is associated to the probe profile associated with the segment of interest.

Alternatively or additionally, the relative significance of different reference segments i.e. the reference scaling coefficients associated therewith in determining an scaling coefficient for a segment may be explored, for example, based on a comparison between the results obtained using an algorithm implementing the method of estimating a scaling coefficient (e.g. based on similarity data and reference segment data) and the scaling coefficient associated with that segment based on measured data i.e. traffic sensor data, where both measured and probe data is available for the segment. This may capture factors affecting the relative importance of reference segments in determining the estimated scaling coefficient for a segment of interest which may not be attributed to probe profile similarity.

In embodiments, a contribution of each reference scaling coefficient to the estimated scaling coefficient for the segment of interest is determined at least in part using a linear regression training model. A set of weighting values e.g. for use in obtaining a weighted sum of the plurality of reference scaling coefficients may be obtained using a linear regression training model. The model may use, for a (or each) reference segment, data indicative of a measured count of vehicles traversing the navigable element represented by the reference segment in respect of the given time as determined based on data measured by the at least one traffic detector associated with the navigable element represented by the reference segment. Such data may be used as base truth data.

The step of determining a contribution of each reference scaling coefficient to the estimated scaling coefficient for a segment of interest using the linear regression training model may involve determining an estimated reference scaling coefficient for one or more, or a plurality of the reference segments in respect of the given time, and, for each such reference segment, comparing the estimated reference scaling coefficient for the measured reference segment to the reference scaling coefficient for the segment obtained using data measured by the at least one traffic detector associated with the reference segment, and determining whether any adjustment of the contribution (e.g. of a set of weighting values) is required. The method may comprise adjusting the contribution of the reference scaling coefficients to an estimated reference scaling coefficient (e.g. adjusting a set of weighting values in respect of the reference scaling coefficients) to result in the estimated reference scaling coefficient more closely matching the measured reference scaling coefficient. The steps of comparing the estimated reference scaling coefficient to the measured reference scaling coefficient and determining whether any adjustment is required, and if so performing such adjustment, may be performed iteratively. The method may comprise obtaining a set of weighting values using the linear regression training model in such a manner.

A method in accordance with any of the embodiments described herein may be repeated to obtain an estimated traffic volume of the segment in respect of one or more further given time. For each such further given time an applicable scaling coefficient may be obtained e.g. estimated relevant to the further given time e.g. based on the same further given time.

The described embodiments extend to the steps of estimating the scaling coefficient for the segment in respect of the given time, and to a method of deriving a function that may be used to estimate a scaling coefficient for a segment in respect of a given time.

In accordance with a further aspect of the described embodiments, there is provided a method for generating traffic data indicative of traffic volume within a navigable network in an area covered by an electronic map, the electronic map comprising a plurality of segments representing navigable elements of the navigable network, the method comprising:
receiving data indicative of a segment of interest, the segment of interest being a segment for which estimated traffic volume data is required, and data indicative of a time of interest;
for each one of a set of a plurality of the segments of the electronic map, obtaining data indicative of a count of devices associated with vehicles traversing the navigable element represented by the segment in respect of a given time selected based on the time of interest, wherein the count of devices is based on positional data and associated timing data relating to the movement of a plurality of devices associated with vehicles along the navigable element represented by the segment;
identifying a reference subset of the set of segments of the electronic map, wherein each segment of the reference subset of segments is associated with at least one traffic detector;
obtaining, for each one of the reference subset of the set of segments of the electronic map, data indicative of a measured count of vehicles traversing the navigable element represented by the segment in respect of the given time based upon data obtained from the at least one traffic detector associated therewith;
obtaining a reference scaling coefficient in respect of each one of the reference subset of segments, each reference scaling coefficient being a scaling coefficient determined in respect of the given time based on the measured count of vehicles traversing the segment in respect of the given time as determined based on data measured by the at least one traffic detector associated with the segment and a count of devices associated with vehicles traversing the segment in respect of the given time based on the positional data and associated timing data relating to the movement of the plurality of devices along the segment;
determining an estimated scaling coefficient for the segment of interest for the given time based on the or each reference scaling coefficient obtained; and
using the estimated scaling coefficient in respect of the given time and the data indicative of the count of devices associated with vehicles traversing the navigable element represented by the segment of interest in respect of the given time based on the positional data and associated timing data relating to the movement of a plurality of devices with respect to time along the navigable element represented by the segment of interest in obtaining the estimated traffic volume for the segment.

The described embodiments in this further aspect may include any or all of the features described in relation to the other aspects and embodiments of the described embodiments.

The method may include any of the features described above in relation to the various steps of estimating the traffic volume data and/or scaling coefficient.

The time of interest is a time for which the estimated traffic volume is to apply.

The given time to which the count data based on probe data applies may be a given time interval as described above.

The method may comprise, for each one of the set of a plurality of the segments of the electronic map, obtaining positional data and associated timing data relating to the movement of a plurality of devices associated with vehicles along the navigable elements represented by the segments, and, for each one of the set of a plurality of the segments, using the positional data and associated timing data to determine the count of devices associated with vehicles traversing the segment in respect of the given time selected based on the time of interest. The count of devices may be obtained solely using positional data and associated timing data relating to the movement of devices associated with vehicles along the navigable element i.e. solely using probe data, and without the use of other forms of data In other embodiments, the required count data based upon probe data may be obtained from a database of such count data in respect of different times e.g. time intervals.

The obtained count of traversals of an element represented by a segment of the reference subset of segments based upon traffic detector data may be based entirely upon data obtained from the at least one traffic detector associated with the element. The step of obtaining the count of traversals based on measured data for a segment may involve obtaining the count from a database of such counts (e.g. a database including such measured count data for different times) or may extend to the step of determining the count based upon data from the at least one traffic detector.

The reference subset of the set of segments preferably comprises a plurality of segments, and may include all segments associated with at least one traffic detector in the set of segments being considered.

The reference scaling coefficient may be obtained by dividing the measured count of vehicles by the count determined using probe data.

Each reference scaling coefficient may provide a contribution to the estimated scaling coefficient.

The method may further comprise obtaining, for each segment in the set of reference segments, a reference probe profile indicative of a variation in a count of devices associated with vehicles traversing the navigable element represented by the segment with respect to time as determined based on positional data and associated timing data relating to the movement of devices associated with vehicles along the navigable element represented by the segment;

and obtaining, for the segment of interest, a probe profile indicative of a variation in the count of devices associated with vehicles traversing the navigable element represented by the segment with respect to time based on positional data and associated timing data relating to the movement of devices associated with vehicles along the navigable element represented by the segment;

wherein the estimated scaling coefficient for the segment of interest for the given time is additionally dependent on a similarity of the probe profile associated with the segment of interest with each of one or more of the reference probe profiles.

Thus the method may comprise determining an estimated scaling coefficient for the segment of interest for the given time using data indicative of a similarity of the probe profile associated with the segment of interest to each one of one or more (and preferably each of) the reference probe profiles obtained (i.e. with a reference probe profile in respect of one or more or each one of the set of reference segments).

The probe profile and reference profile are each based on probe data. The method may extend to determining the reference probe profile and probe profile for the segment of interest based upon obtained positional data and associated timing data relating to the movement of a plurality of devices associated with vehicles along the navigable element represented by the segment. Such a profile may be obtained using existing count data for different times e.g. from a database, or such count data may be obtained using the probe data.

The method may comprise, comparing the probe profile for the segment of interest to each one of a plurality of reference probe profiles (e.g. to each reference profile considered), and determining a similarity parameter indicative of a similarity of the probe profile for the segment of interest to the reference probe profile. The method may thus comprise obtaining a set of similarity parameters indicative of a similarity of the probe profile for the segment of interest to each said reference probe profile. The scaling coefficient for the segment of interest may be estimated using the set of similarity parameters.

The similarity data may be used with the reference scaling coefficient data in deriving the estimated scaling coefficient for the segment of interest e.g. to determine a contribution of each reference scaling coefficient to the estimated scaling coefficient determined for the segment of interest.

The method may comprise determining the estimated scaling coefficient for the segment of interest based on each reference scaling coefficient obtained and a similarity of the probe profile associated with the segment of interest to each one of the reference profiles.

The estimated scaling coefficient for the segment of interest may be based upon a weighted sum of the reference scaling coefficients. In embodiments, a contribution of each reference scaling coefficient to the estimated scaling coefficient for the segment of interest is determined at least in part using a linear regression training model. A set of weighting values for use in obtaining the weighted sum of the plurality of reference scaling coefficients may be obtained using a linear regression training model. The linear regression training model may use, for each reference segment, data indicative of a measured count of vehicles traversing the navigable element represented by the reference segment in respect of the given time as determined based on data measured by the at least one traffic detector associated with the navigable element represented by the reference segment. Such data may be used as base truth data.

The step of determining a contribution of each reference scaling coefficient to the estimated scaling coefficient for the segment of interest may be performed in any of the manners described above.

A contribution of a reference scaling coefficient to the overall estimated scaling coefficient for a segment of interest may be based at least in part upon the similarity of the reference probe profile associated with the reference segment with which the reference scaling coefficient is associated to the probe profile associated with the segment of interest. The segment of interest for which the estimated scaling coefficient is determined may be a segment representing a navigable element which is not associated with any traffic detector. The segment of interest may, therefore, not form part of the subset of reference segments.

In accordance with a further aspect of the described embodiments, there is provided a method for estimating a traffic volume in respect of a given time for a given segment of an electronic map representing a navigable network in an area, the electronic map comprising a plurality of segments representing navigable elements of the navigable network in the area, wherein the navigable network in the area includes navigable stretches which are associated with at least one traffic detector and navigable stretches which are not associated with any traffic detector, and wherein the given segment is a segment representing at least a portion of a navigable stretch of the navigable network in the area which is not associated with any traffic detector, wherein the electronic map further comprises a plurality of reference segments, each reference segment being a segment representing at least a portion of a navigable stretch of the navigable network in the area which is associated with a traffic detector, and wherein each reference segment is associated with data indicative of a respective reference scaling coefficient for the given time, the reference scaling coefficient being based on a measured count of vehicles traversing the at least a portion of the stretch represented by the reference segment in respect of the given time and a count of devices associated with vehicles traversing the at least a portion of the stretch represented by the reference segment in respect of the given time, the measured count of vehicles being based on data measured by the at least one traffic detector associated with the stretch, and the count of devices associated with vehicles being based on positional data and associated timing data relating to the movement of a plurality of devices along the at least a portion of the stretch represented by the reference segment, the method comprising:
  estimating the traffic volume for the given segment in respect of the given time using data indicative of a count of devices associated with vehicles traversing the at least a portion of the stretch of the navigable network represented by the given segment in respect of the given time and an estimated scaling coefficient for the given time for the given segment, wherein the estimated scaling coefficient for the segment is based on the reference scaling coefficients associated with each one of a subset of one or more reference segments of the electronic map which are associated with the given segment, and wherein the count of devices is based on positional data and associated timing data relating to the movement of a plurality of devices with respect to time along the at least a portion of the navigable stretch represented by the given segment; and
  generating data indicative of the estimated traffic volume for the given segment in respect of the given time.

The described embodiments in this further aspect may include any or all of the features described in relation to the other aspects and embodiments of the described embodiments.

The method may include any of the features described above in relation to the various steps of estimating the traffic volume data and/or scaling coefficients.

The given time is a time for which the estimated traffic volume is to apply.

As in the earlier aspects and embodiments, the given time may be any suitable time, such as a current time or future time. The given time may alternatively be a time in the past. The given time may be obtained based upon an indicated time of interest. The time of interest may be determined in any of the manners described in respect of the earlier aspects and embodiments. Likewise, the given segment may be determined in any of the above mentioned manners, and may be referred to as a segment of interest. Data indicative of the segment of interest and/or time of interest may be received from any suitable source as previously described.

The given time to which the count data based on probe data applies may be a given time interval as described above. The given time may be a recurrent time interval. For example, the given time may be a time interval on a given day of the week.

The method may be performed in relation to one or more given segment of the electronic map. The steps described will then be performed in respect of each given segment considered.

As mentioned in relation to the earlier aspects and embodiments, the navigable network in the area considered includes navigable stretches which are associated with at least one traffic detector, and navigable stretches which are not associated with any traffic detector. A navigable stretch may comprise at least a portion of one or more navigable element of the navigable network. In some embodiments the navigable stretches correspond to respective navigable elements of the navigable network.

Navigable stretches associated with at least one traffic detector are such that a measured count of vehicles traversing the segment at a given time is available for the stretch. In contrast, such measured count data is not available for navigable stretches which are not associated with any traffic detector. A traffic detector may be defined as previously described.

The given segment is a segment representing at least a portion of a navigable stretch of the navigable network in the area which is not associated with any traffic detector. Thus the given segment is a segment for which measured count data is not available. The given segment may represent a navigable element for which measured count data is not available (i.e. which is not associated with any traffic detector). The or each given segment may be considered to be a "non-reference" segment.

A navigable stretch comprises at least a portion of one or more navigable elements of the navigable network.

The reference segments may be as previously defined. Each reference segment represents at least a portion of a navigable stretch for which measured count data is available. Each reference segment may represent a navigable element for which measured count data is available (i.e. which is associated with at least one traffic detector). The reference segment may be representative of at least a portion of one or more navigable elements of the navigable network forming the stretch for which measured count data is available. A navigable stretch may be considered to be associated with a traffic detector when measured count data is available for the navigable stretch, wherever the traffic detector(s) are located. Thus the particular portion of the stretch which is represented by the reference segment may not itself comprise a traffic detector, provided that measured count data applicable to the portion of the stretch represented by the reference segment is available e.g. based on data obtained from one or more traffic detectors arranged in any suitable position to determine a count of vehicle travelling along the stretch.

In these further aspects or embodiments, and indeed, in accordance with any of the aspects or embodiments described herein, it will be appreciated that the given segment may be a segment representing at least a portion of a navigable stretch of the navigable network in an area for which data indicative of an absolute count of vehicles traversing the at least a portion of the navigable stretch is unavailable. Conversely, the or each reference segment is a segment representing at least a portion of a navigable stretch of the navigable network in an area for which data indicative of an absolute count of vehicles traversing the at least a portion of the navigable stretch is available. Thus, more broadly, the "non-reference" and "reference" segments may be segments for which absolute count data is and is not available. Such absolute count data may be data obtained from a traffic detector associated with the stretch as described herein.

Each reference segment is associated with data indicative of a respective reference scaling coefficient for the given time. The reference scaling coefficient is based on a measured count of vehicles traversing the at least a portion of a stretch represented by the reference segment for the given time and a count of devices associated with vehicles traversing the at least a portion of the stretch represented by the reference segment in respect of the given time. The measured count of vehicles is based on data measured by the at least one traffic detector associated with the stretch, and the count of devices associated with vehicles is based on positional data and associated timing data relating to the movement of a plurality of devices along the at least a portion of the stretch. As mentioned above, the at least one traffic detector may be associated in any manner with the stretch so as to provide measured count data therefor, which is applicable to the portion of the stretch represented by the reference segment (and may not necessarily be located on the portion of the stretch represented by the reference segment).

Thus the reference scaling coefficient is based on the measured count data applicable to the segment for the given time (i.e. measured by the at least one traffic detector) and a count based on vehicle probe data for the segment for the given time. The reference scaling coefficient may be based on a ratio of the measured count and probe data count for the segment for the given time. The reference scaling coefficient may be obtained by dividing the measured count of vehicles by the count determined using probe data.

The reference segments may be associated in any suitable manner with data indicative of a reference scaling coefficient for the given time. Each reference segment may be associated with data indicative of a time-dependent reference scaling coefficient profile from which the reference scaling coefficient for the given time may be obtained. The reference scaling coefficient profile is indicative of a variation in the reference scaling coefficient for the reference segment with respect to time. The reference scaling coefficient for the given time may then be obtained from the scaling coefficient profile. A reference scaling coefficient profile may be based at least in part on a probe profile for the reference segment. A probe profile is indicative of a variation in a count of devices associated with vehicles traversing the at least a portion of a navigable stretch represented by the given reference segment with respect to time as determined based on positional data and associated timing data relating to the movement of a plurality of devices associated with vehicles along the at least a portion of the navigable stretch represented by the reference segment. The reference scaling coefficient profile may be based on such a probe profile and a profile indicative of a variation in the measured count of vehicles traversing the at least a portion of the stretch represented by the reference segment with respect to time.

The reference scaling coefficients may be based on live data and/or historical data. For example, regardless of whether the given time is in the past, present or future, historical probe data in the form of a probe profile may be used in obtaining the reference scaling coefficient. The probe profile is indicative of the count of devices used in obtaining the reference scaling coefficient. The measured count data used may also be based on live data and/or historical data. Thus, the probe data and measured count data used to provide the reference scaling coefficient may be based on live data, historic data or any combination thereof, provided that the resulting coefficient may be considered to be applicable to the current time. Advantageously, where the given time is a current time the reference scaling coefficient is based at least in part upon live data e.g. live measured count and/or live probe data. This may provide a more accurate coefficient. Live data is data which may be considered to reflect the current conditions in the navigable network. Historical data may or may not additionally be used.

The traffic volume for the given segment in respect of the given time is estimated using a count of devices associated with vehicles traversing the at least a portion of the stretch of the navigable network represented by the given segment in respect of the given time i.e. vehicle probe data for the segment for the given time, and an estimated scaling coefficient for the given segment for the given time, the estimated scaling coefficient being based on one or more of the reference scaling coefficients.

The counts based on probe data and measured data for a reference segment may be based on live data and/or historical data. For example, regardless of whether the given time is in the past, present or future, historical probe data in the form of a probe profile may be used. Live data may be used in addition or as an alternative to historical data where the given time is a current time. A probe profile is indicative of a variation in a count of devices associated with vehicles traversing the at least a portion of a navigable stretch represented by the given reference segment with respect to time as determined based on positional data and associated timing data relating to the movement of a plurality of devices associated with vehicles along the at least a portion of the navigable stretch represented by the reference segment.

The reference scaling coefficients associated with one, more than one, or all of the reference segments may be used in determining the traffic volume for the given segment. Thus, the estimated scaling coefficient may be based on a subset of a set of a plurality of reference scaling coefficients associated with ones of the plurality of reference segments, which subset may be a single one of the reference scaling coefficients, or may comprise a plurality thereof.

The method may further comprise the step of determining a subset of one or more of the plurality of reference segments of the electronic map associated with the given segment, wherein the estimated scaling coefficient is based on reference scaling coefficients associated with each one of the set of one or more of the reference segments. The navigable network will include various stretches which may give rise to reference segments of the electronic map. Some of these reference segments may be of greater relevance than others when determining the estimated scaling coefficient for the given segment. Thus in these embodiments only the reference scaling coefficients associated with reference segments which may be considered to be associated with the given segment are taken into account when determining the estimated scaling coefficient of the given segment. The subset of the reference segments associated with the given segment may be a single reference segment or a plurality of reference segments forming a subset of the total number of reference segments of the electronic map representing stretches of the navigable network in the area associated with a traffic detector. Thus the given segment may be associated with a single reference segment, or with a plurality of reference segments.

The subset of one or more reference segments may be associated with the data indicative of the given segment in the electronic map. Thus, the association of the reference segments and the segment of interest may already be known. In other embodiments, the method may extend to identifying the subset of one or more reference segments.

Whether or not the method extends to the step of identifying the subset of one or more reference segments associated with the given segment, the subset of one or more reference segments may be selected in any suitable manner.

The subset of one or more reference segments may be determined based on a comparison of a probe profile associated with the given segment to reference probe profiles associated with ones of the reference segments, wherein the probe profile is indicative of a variation in a count of devices associated with vehicles traversing the at least a portion of a navigable stretch represented by the given segment with respect to time as determined based on positional data and associated timing data relating to the movement of a plurality of devices associated with vehicles along the at least a portion of the navigable stretch represented by the segment, and wherein the reference probe profile is indicative of a variation in a count of devices associated with vehicles traversing the at least a portion of the navigable stretch represented by the reference segment with respect to time as determined based on positional data and associated timing data relating to the movement of a plurality of devices associated with vehicles along the at least a portion of the navigable stretch represented by the reference segment. The probe profile and reference probe profiles are thus time dependent probe profiles, such as a weekly probe profiles.

The subset of one or more reference segments may comprise (or correspond to) one or more reference segments having reference probe profiles determined to be most similar to the probe profile of the given segment. The similarity may be assessed in any suitable manner. For example, a single most similar reference segment may be identified. Alternatively, each reference probe profile may be assigned a respective similarity value, and the reference probe profiles may be ranked in order of similarity. A predefined number of the most similar probe profiles may then be selected, or all reference probe profiles having a similarity above a predetermined threshold may be included in the set of one or more reference segments.

Alternatively or additionally the selection of the subset of one or more reference segments may be based at least in part on a proximity of a reference segment to the given segment. The proximity may be a temporal and/or spatial proximity. For example, the subset of reference segments may comprise or correspond to a predefined number of the closest reference segments in terms of travel time or distance. Alternatively the subset of reference segments may comprise or correspond to segments within a predetermined travel time or distance of the given segment. The distance and/or travel time may be measured based on straight-line paths between the segments or along the road network.

Alternatively or additionally, the selection of the subset of one or more reference segments may be based at least in part on a similarity of one or more of the properties of a reference segment to the given segment. For example, the properties may include Functional Road Class. Any relevant properties may be taken into account. Each reference segment may be assigned a similarity value indicative of its similarity to the given segment. For example, the subset of reference segments may comprise or correspond to a subset of reference segments considered to be most similar to the given segment (e.g. a predefined number of the segments, or segments having a similarity above a given threshold etc).

Any one or ones of the above measures may be used to try to obtain the subset of references segments for use in determining the estimated scaling coefficient which may be expected to be relevant to the given segment. Where multiple factors are used, any suitable technique may be used to obtain a subset of reference segments simultaneously meeting all criteria considered. Some weighting of the different criteria may be used.

The estimated scaling coefficient for the given segment may be determined in any of the manners discussed above using the one or more reference scaling coefficients upon which it is based.

The estimated scaling coefficient for the given segment may be estimated using data indicative of a similarity of a probe profile associated with the given segment to each one of a set of one or more reference probe profiles, each reference probe profile being associated with a respective one of the one or more reference segments whose reference scaling coefficient is used in determining the estimated scaling coefficient. The probe profile may be indicative of a variation in a count of devices associated with vehicles traversing the at least a portion of the navigable stretch represented by the given segment with respect to time as determined based on positional data and associated timing data relating to the movement of a plurality of devices associated with vehicles along the at least a portion of the navigable stretch represented by the segment, and the reference probe profile may be indicative of a variation in a count of devices associated with vehicles traversing the at least a portion of the navigable stretch represented by the reference segment with respect to time as determined based on positional data and associated timing data relating to the movement of a plurality of devices associated with vehicles along the at least a portion of the navigable stretch represented by the reference segment.

Where multiple reference scaling coefficients are considered, a contribution of a given reference scaling coefficient to the estimated scaling coefficient for the given segment may be based at least in part upon the similarity of the reference probe profile associated with the reference segment with which the reference scaling coefficient is associated to the probe profile associated with the given segment.

Alternatively or additionally a contribution of each reference scaling coefficient to the estimated scaling coefficient may be based at least in part on a proximity of the reference segment associated with the reference scaling coefficient to the given segment. The proximity may be a temporal or spatial proximity, and may be of any of the types discussed above in relation to determining the subset of reference segments. Greater weight may be assigned to reference scaling coefficients associated with reference segments closer to the given segment. A contribution of a reference scaling coefficient associated with a given reference segment to the estimated scaling coefficient for the given segment may approach a value corresponding to an average of the reference scaling coefficients considered with increasing distance of the given reference segment from the given segment. The distance may be a temporal or spatial distance.

The estimated scaling coefficient may be based upon a weighted sum of a plurality of reference scaling coefficients.

Data indicative of a set of weighting values for use in obtaining the weighted sum of the plurality of reference scaling coefficients may be obtained using a linear regression training model.

The linear regression training model may use data indicative of a measured count of vehicles traversing the at least a portion of a navigable stretch represented by the reference segment in respect of the given time as determined based on data measured by the at least one traffic detector associated with the navigable stretch.

Accordingly, in accordance with these further aspects and embodiments, the reference scaling coefficient associated with each reference segment may be based on a ratio of the measured count for the given time based on the traffic detector data and the count of devices for the given time based on the positional and associated timing data.

Each reference segment may be associated with data indicative of a time-dependent reference scaling coefficient profile, wherein the reference scaling coefficient profile is indicative of a variation in the reference scaling coefficient for the reference segment with respect to time.

The reference scaling coefficient profile may be based at least in part on a probe profile indicative of a variation in a count of devices associated with vehicles traversing the at least a portion of a navigable stretch represented by the given reference segment with respect to time as determined based on positional data and associated timing data relating to the movement of a plurality of devices associated with vehicles along the at least a portion of the navigable stretch represented by the reference segment.

The given time may be a current time and the reference scaling coefficient may be based at least in part on live data.

The method may further comprise determining a subset of one or more of the reference segments which are associated with the given segment, wherein the estimated scaling coefficient is based on the reference scaling coefficients associated with each one of the subset of one or more of the reference segments.

The subset of one or more reference segments may be determined at least in part based on a comparison of a probe profile associated with the given segment to reference probe profiles associated with ones of the reference segments, wherein the probe profile is indicative of a variation in a count of devices associated with vehicles traversing the at least a portion of a navigable stretch represented by the given segment with respect to time as determined based on positional data and associated timing data relating to the movement of a plurality of devices associated with vehicles along the at least a portion of the navigable stretch represented by the segment, and wherein the reference probe profile is indicative of a variation in a count of devices associated with vehicles traversing the at least a portion of the navigable stretch represented by the reference segment with respect to time as determined based on positional data and associated timing data relating to the movement of a plurality of devices associated with vehicles along the at least a portion of the navigable stretch represented by the reference segment.

The subset of one or more reference segments may comprise one or more reference segments having reference probe profiles determined to be most similar to the probe profile of the given segment.

The selection of the subset of one or more reference segments may be based at least in part on a proximity of a reference segment to the position of the given segment.

The selection of the subset of one or more reference segments may be based at least in part on a similarity of the properties of a reference segment to the given segment, for example wherein the properties include Functional Road Class (FRC).

The estimated scaling coefficient for the given segment may be estimated using data indicative of a similarity of a probe profile associated with the given segment to each one of a set of one or more reference probe profiles, each reference probe profile being associated with a respective one of the one or more reference segments whose reference scaling coefficient is used in determining the estimated scaling coefficient, wherein the probe profile is indicative of a variation in a count of devices associated with vehicles traversing the at least a portion of a navigable stretch represented by the given segment with respect to time as determined based on positional data and associated timing data relating to the movement of a plurality of devices associated with vehicles along the at least a portion of the navigable stretch represented by the segment, and wherein the reference probe profile is indicative of a variation in a count of devices associated with vehicles traversing the at least a portion of the navigable stretch represented by the reference segment with respect to time as determined based on positional data and associated timing data relating to the movement of a plurality of devices associated with vehicles along the at least a portion of the navigable stretch represented by the reference segment.

The estimated scaling coefficient for the given segment may be based on a plurality of the reference scaling coefficients, and a contribution of a given reference scaling coefficient to the estimated scaling coefficient for the given segment is based at least in part upon the similarity of the reference probe profile associated with the reference segment with which the reference scaling coefficient is associated to the probe profile associated with the given segment.

The estimated scaling coefficient for the given segment may be based on a plurality of the reference scaling coefficients, and a contribution of each reference scaling coefficient to the estimated scaling coefficient is based at least in part on a proximity of the reference segment associated with the reference scaling coefficient to the given segment; optionally wherein greater weight is assigned to reference scaling coefficients associated with reference segments closer to the given segment.

The estimated scaling coefficient may be based upon a weighted sum of a plurality of reference scaling coefficients.

Data indicative of a set of weighting values for use in obtaining the weighted sum of the plurality of reference scaling coefficients may be obtained using a linear regression training model.

The linear regression training model may use data indicative of a measured count of vehicles traversing the at least a portion of a navigable stretch represented by the reference segment in respect of the given time as determined based on data measured by the at least one traffic detector associated with the navigable stretch.

The method may further comprise receiving data indicative of the given segment for which traffic volume data is required and data indicative of a time of interest, and using the data indicative of the time of interest to identify the given time.

The given time may be a current time or a future time.

The given time may be a time interval, optionally a recurrent time interval, such as a time interval on a given day of the week.

The method may further comprise associating data indicative of the estimated traffic volume with data indicative of the given segment to which it relates; and optionally transmitting data indicative of the obtained estimated traffic volume for the given segment and/or displaying data indicative of the obtained estimated traffic volume for the given segment to a user.

The method may further comprise storing the estimated traffic volume and/or traffic density for subsequent display and/or comprising displaying the estimated traffic volume and/or traffic density to a user.

The method in accordance with any of its aspects or embodiments may be repeated for one or more additional segment of interest and/or one or more additional time of interest. Thus, the method may comprise determining an estimated traffic volume for at least one further time of interest in relation to the (same) segment of interest using an estimated scaling coefficient determined with respect to a different given time selected based on the additional time of interest. The method may extend to estimating the scaling coefficient in respect of the different given time. The Applicant has also recognised that in order to obtain a more accurate estimate of traffic volume of a segment, the (value of the) scaling coefficient should vary dependent upon the position of the segment (of interest). Preferably the scaling coefficient (used or estimated in accordance with any aspects or embodiments) is position dependent, and the (value of the) scaling coefficient used is applicable to the position of the segment being considered. The value of the scaling coefficient may be specific to the segment being considered, or, in other embodiments, the same scaling coefficient may be applicable to more than one segment e.g. to a segment within a given geographic area. The scaling coefficient is, again, preferably an estimated scaling coefficient.

It is believed that such aspects are advantageous in their own right, whether or not the scaling coefficient is time dependent.

From a further aspect of the described embodiments there is provided a method for generating traffic data indicative of traffic volume within a navigable network in an area covered by an electronic map, the electronic map comprising a plurality of segments representing navigable elements of the navigable network, the method comprising, for one or more segment of the electronic map:

obtaining data indicative of a count of devices associated with vehicles traversing the navigable element represented by the segment in respect of a given time, wherein the count of devices is based on positional data and associated timing data relating to the movement of a plurality of devices associated with vehicles along the navigable element represented by the segment; and using the determined count data and a scaling coefficient to obtain data indicative of an estimated traffic volume for the segment in respect of the given time, wherein the scaling coefficient is a position dependent scaling coefficient, and the method comprises using the scaling coefficient in respect of a position associated with the segment in obtaining the estimated traffic volume for the segment.

The described embodiments in this aspect may include any or all of the features described in relation to the earlier aspects of the described embodiments, and vice versa, to the extent that they are not mutually inconsistent.

The estimated traffic volume is in respect of a given time, which is preferably a time interval, as described in the earlier embodiments.

Preferably the scaling coefficient for the segment is an estimated scaling coefficient.

Preferably the scaling coefficient is additionally time dependent. Thus the scaling coefficient may be in respect of the given time as in the earlier described embodiments. It will be appreciated that in embodiments at least, the above time dependent embodiments will also provide a position dependent i.e. segment dependent estimated scaling coefficient.

A method for estimating a scaling coefficient that is position dependent, whether or not it is additionally time dependent, may be performed using a set of reference scaling coefficients in a similar manner to the timing dependent embodiments above. However, for these further embodiments, the reference scaling coefficients need not be in respect of the given time to which the count data used in determining the estimated traffic volume relates. In other words, they need not be time dependent.

In embodiments the scaling coefficient is based upon a set of one or more reference scaling coefficients, each reference scaling coefficient being a scaling coefficient determined in respect of a one of a set of one or more reference segments, wherein each reference segment is a segment representing a navigable element associated with at least one traffic detector, and the reference scaling coefficient for the reference segment is obtained using data obtained from the at least one traffic detector associated therewith.

Each reference scaling coefficient may be determined using a count of devices associated with vehicles traversing the navigable element represented by the reference segment based on positional data and associated timing data relating to the movement of a plurality of devices associated with vehicles along the navigable element represented by the reference segment, and a measured count of vehicles traversing the reference segment as determined based on data measured by the set of one or more traffic detectors associated with the reference segment. The respective probe and measured counts may be in respect of any reference time (i.e. time interval), which preferably corresponds to the given time. However, it will be appreciated that for non-time dependent embodiments, the reference time may be a different time to the given time. For example, the same reference time may be obtained for determining the reference scaling coefficients used for determining an estimated scaling coefficient for a segment of interest in respect of different given times.

Position dependent embodiments may or may not also involve consideration of the similarity of a probe profile of the segment (or interest) to a reference probe profile associated with each of one or more, or preferably a plurality of reference segments associated with at least one traffic detector. Embodiments considering similarity may be performed as described above e.g. using a kernel function to assess similarity. Where this is the case, the set of reference segments considered in relation to the similarity assessment may or may not correspond to those considered in relation to position.

As in the earlier embodiments, the position dependent scaling coefficient may be estimated based upon contributions from a plurality of reference scaling coefficients. For example, the estimated scaling coefficient may be based upon a weighted sum of the plurality of reference scaling coefficients.

A contribution of each reference scaling coefficient to the overall estimated scaling coefficient for the segment (of interest) may be based on a distance between a position associated with the reference segment associated with the reference scaling coefficient, and a position of the segment being considered. Greater weight may be assigned to reference scaling coefficients associated with reference segments closer to the position of the segment being considered. The contribution of a reference scaling coefficient associated with a given reference segment in a given electronic map area to the estimated scaling coefficient for the segment may approach a value corresponding to an average of the reference scaling coefficients associated with reference segments in the given electronic map area with increasing distance of a position associated with the given reference segment from a position of the segment (of interest). This may be achieved using a decay function. The decay function may decay to an average reference scaling coefficient contribution value for the area. Any suitable reference distance may be used when assessing distance in these embodiments e.g. a Euclidian distance measured between reference points e.g. start, median, end of road segments, a routing distance e.g. shortest or fastest distance, or a distance dependent upon road class.

A contribution of each reference scaling coefficient to the overall estimated scaling coefficient for the segment (of interest) may alternatively or additionally be based on the similarity of a reference probe profile associated with the reference segment to that of the segment (of interest).

A contribution of each reference scaling coefficient to the overall estimated scaling coefficient for the segment (of interest) may alternatively or additionally be based at least in part on the result of performing a linear regression training model. In any of these embodiments, the scaling coefficient may be time dependent. For example, this may be implemented using appropriate time dependent data in a linear regression training model as described above.

The model may use data indicative of a measured count of vehicles traversing the navigable element represented by the reference segment in respect of a given time as determined based on data measured by the at least one traffic detector associated with the navigable element represented by the reference segment.

The method in accordance with any of its aspects or embodiments may be repeated for one or more additional segment of interest and/or one or more additional time of interest. Thus, the method may comprise determining an estimated traffic volume for at least one further time of interest in relation to the (same) segment of interest using an scaling coefficient determined with respect to a different given time selected based on the additional time of interest. The method may extend to estimating the scaling coefficient in respect of the different given time.

In accordance with the described embodiments in any of its aspects or embodiments, a or the set of a plurality of the segments of the electronic map for which data indicative of a count of devices associated with vehicles traversing the navigable element represented by the segment in respect of a given time is obtained, wherein the count of devices is based on positional data and associated timing data relating to the movement of a plurality of devices associated with vehicles along the navigable element represented by the segment, may be a set of a plurality of the segments of the electronic map in a given map area.

The segment for which the scaling coefficient is determined in accordance with any aspects or embodiments is preferably a segment for which measured traffic data obtained by measuring traffic traversing the element represented by the segment is unavailable e.g. to a server performing the methods described herein. The segment may be a segment representing a navigable element which is not associated with any traffic detector. Such a segment thus does not form part a set of reference segments associated with traffic detectors.

References to a traffic detector associated with an element represented by a segment herein (or, for ease of reference to a traffic detector associated with a segment) refer to a traffic detector forming part of a fixed infrastructure of the navigable network, such as an induction loop, traffic camera, infrared, radar, photoelectric sensors, or any type of sensor. Such traffic detectors forming part of a fixed infrastructure are distinct from floating vehicle or probe data, in which vehicles traversing the network of navigable elements are themselves used as sensors.

The step of obtaining the estimated traffic volume for the segment in accordance with any aspects or embodiments using the determined probe count data and scaling coefficient may comprise multiplying the count by the scaling coefficient. This is in accordance with equation 1 above.

The described embodiments extend to systems for performing the steps of the method in accordance with any of the aspects of the described embodiments.

In accordance with a further aspect of the described embodiments there is provided a system for generating traffic data indicative of traffic volume within a navigable network in an area covered by an electronic map, the electronic map comprising a plurality of segments representing navigable elements of the navigable network, the system comprising a set of one or more processors for performing a method comprising the steps of, for one or more segment of the electronic map:

obtaining data indicative of a count of devices associated with vehicles traversing the navigable element represented by the segment in respect of a given time, wherein the count of devices is based on positional data and associated timing data relating to the movement of a plurality of devices associated with vehicles along the navigable element represented by the segment;

and using the determined count data and a scaling coefficient to obtain data indicative of an estimated traffic volume for the segment in respect of the given time;

wherein the scaling coefficient is a time dependent scaling coefficient, and the method comprises using the scaling coefficient in respect of the given time in obtaining the estimated traffic volume for the segment.

The described embodiments in this aspect may include any or all of the features described in relation to the other aspects, and vice versa, to the extent that they are not mutually inconsistent. Thus, even if not explicitly stated herein, the system may comprise means, or a set of one or more processors, or circuitry for carrying out any of the steps of the method or the described embodiments as described herein.

In accordance with a further aspect of the described embodiments, there is provided a system for generating traffic data indicative of traffic volume within a navigable network in an area covered by an electronic map, the electronic map comprising a plurality of segments representing navigable elements of the navigable network, the system comprising a set of one or more processors for performing a method comprising:

receiving data indicative of a segment of interest, the segment of interest being a segment for which estimated traffic volume data is required, and data indicative of a time of interest;

for each one of a set of a plurality of the segments of the electronic map, obtaining data indicative of a count of devices associated with vehicles traversing the navigable element represented by the segment in respect of a given time selected based on the time of interest, wherein the count of devices is based on positional data and associated timing data relating to the movement of a plurality of devices associated with vehicles along the navigable element represented by the segment;

identifying a reference subset of the set of segments of the electronic map, wherein each segment of the reference subset of segments is associated with at least one traffic detector;

obtaining, for each one of the reference subset of the set of segments of the electronic map, data indicative of a measured count of vehicles traversing the navigable element represented by the segment in respect of the given time based upon data obtained from the at least one traffic detector associated therewith;

obtaining a reference scaling coefficient in respect of each one of the reference subset of segments, each reference scaling coefficient being a scaling coefficient determined in respect of the given time based on the measured count of vehicles traversing the segment in respect of the given time as determined based on data measured by the at least one traffic detector associated with the segment and a count of devices associated with vehicles traversing the segment in respect of the given time based on the positional data and associated timing data relating to the movement of the plurality of devices along the segment;

determining an estimated scaling coefficient for the segment of interest for the given time based on the or each reference scaling coefficient obtained;

and using the estimated scaling coefficient in respect of the given time and the data indicative of the count of devices associated with vehicles traversing the navigable element represented by the segment of interest in respect of the given time based on the positional data and associated timing data relating to the movement of a plurality of devices with respect to time along the navigable element represented by the segment of interest in obtaining the estimated traffic volume for the segment.

The described embodiments in this aspect may include any or all of the features described in relation to the other aspects, and vice versa, to the extent that they are not mutually inconsistent. Thus, even if not explicitly stated herein, the system may comprise means, or a set of one or more processors, or circuitry for carrying out any of the steps of the method or the described embodiments as described herein.

In accordance with yet a further aspect of the described embodiments, there is provided a system for estimating a traffic volume in respect of a given time for a given segment of an electronic map representing a navigable network in an area, the electronic map comprising a plurality of segments representing navigable elements of the navigable network in the area, wherein the navigable network in the area includes navigable stretches which are associated with at least one traffic detector and navigable stretches which are not associated with any traffic detector, and wherein the given segment is a segment representing at least a portion of a navigable stretch of the navigable network in the area which is not associated with any traffic detector, wherein the electronic map further comprises a plurality of reference segments, each reference segment being a segment representing at least a portion of a navigable stretch of the navigable network in the area which is associated with a traffic detector, and wherein each reference segment is associated with data indicative of a respective reference scaling coefficient for the given time, the scaling coefficient being based on a measured count of vehicles traversing the at least a portion of the stretch represented by the reference segment in respect of the given time and a count of devices associated with vehicles traversing the at least a portion of the stretch represented by the reference segment in respect of the given time, the measured count of vehicles being based on data measured by the at least one traffic detector associated with the stretch, and the count of devices associated with vehicles being based on positional data and associated timing data relating to the movement of a plurality of devices along the at least a portion of the stretch represented by the reference segment, the system comprising a set of one or more processors for performing a method comprising the steps of:

estimating the traffic volume for the given segment in respect of the given time using data indicative of a count of devices associated with vehicles traversing the at least a portion of the stretch of the navigable network represented by the given segment in respect of the given time and an estimated scaling coefficient for the given time for the given segment, wherein the estimated scaling coefficient for the segment is based on the reference scaling coefficients associated with each one of a subset of one or more reference segments of the electronic map which are associated with the given segment, and wherein the count of devices is based on positional data and associated timing data relating to the movement of a plurality of devices with respect to time along the at least a portion of the navigable stretch represented by the given segment; and generating data indicative of the estimated traffic volume for the given segment in respect of the given time.

The described embodiments in this aspect may include any or all of the features described in relation to the other aspects, and vice versa, to the extent that they are not mutually inconsistent. Thus, even if not explicitly stated herein, the system of the described embodiments may comprise means, or a set of one or more processors, or circuitry for carrying out any of the steps of the method or the described embodiments as described herein.

In accordance with yet a further aspect of the described embodiments, there is provided;

a system for generating traffic data indicative of traffic volume within a navigable network in an area covered by an electronic map, the electronic map comprising a plurality of segments representing navigable elements of the navigable network, the system comprising a set of one or more processors for performing a method comprising, for one or more segment of the electronic map:

obtaining data indicative of a count of devices associated with vehicles traversing the navigable element represented by the segment in respect of a given time, wherein the count of devices is based on positional data and associated timing data relating to the movement of a plurality of devices associated with vehicles along the navigable element represented by the segment;

and using the determined count data and an scaling coefficient to obtain data indicative of an estimated traffic volume for the segment in respect of the given time;

wherein the scaling coefficient is a position dependent scaling coefficient, and the method comprises using the scaling coefficient in respect of a position associated with the segment in obtaining the estimated traffic volume for the segment.

The described embodiments in this aspect may include any or all of the features described in relation to the other aspects, and vice versa, to the extent that they are not mutually inconsistent. Thus, even if not explicitly stated herein, the system of the described embodiments may comprise means, or a set of one or more processors, or circuitry for carrying out any of the steps of the method or the described embodiments as described herein.

In some embodiments the system of any of these further aspects of the described embodiments comprises one or more servers. The method may be performed by a server operating on suitable sources of measured traffic data and vehicle probe data e.g. filtering to obtain data for the applicable time. However, arrangements are envisaged, and the steps may be implemented by a distributed system, which may include one or more server and/or one or more computing device of any type e.g. a navigation device.

The various functions described herein can be carried out in any desired and suitable manner. For example, the described embodiments can generally be implemented in hardware or software, as desired. Thus, for example, unless otherwise indicated, the various functional elements, stages, units, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

The means (processing circuitry) for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, the generated traffic volume and/or traffic density data. The system may further comprise display means, such as a computer display, for displaying, for example, the generated traffic volume and/or traffic density data.

The methods described herein are computer implemented methods.

The methods of the described embodiments are, in some embodiments, implemented by a server. Thus, in embodiments, the system comprises a server comprising means (processing circuitry) for carrying out the various steps described, and the method steps described herein are carried out by a server.

The navigable network may comprise a road network, wherein each navigable element represents a road or a portion of a road. For example, a navigable element can represent a road between two adjacent intersections of the road network, or a navigable element may represent a portion of a road between two adjacent intersections of the road network. As will be appreciated, however, the navigable network is not limited to a road network, and may comprise, for example, a network of foot paths, cycle paths, rivers, etc. It should be noted that the term "segment" as used herein takes its usual meaning in the art. A segment of an electronic map is a navigable link that connects two points or nodes. While the described embodiments are described with particular reference to road segments, it should be realised that the described embodiments may also be applicable to other navigable segments, such as segments of a path, river, canal, cycle path, tow path, railway line, or the like. Thus, any reference to a "road segment" may be replaced by a reference to a "navigable segment" or any specific type or types of such segments.

The network is represented by electronic map data. The electronic map data may be stored by or otherwise accessible by the server, in embodiments in which the method is implemented using a server. The electronic map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of three lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc.

In various aspects and embodiments, the described embodiments comprises a step of obtaining and/or using positional data and associated timing data relating to the movement of a plurality of devices along navigable elements of the navigable network as represented by the electronic map data. The positional data may provide data indicative of the movement of the plurality of devices along the navigable elements with respect to time. The positional data used in accordance with the described embodiments is positional data relating to the movement of a plurality of devices along the or each navigable element. The method may comprise obtaining positional data and associated timing data relating to the movement of a plurality of devices in the navigable network, and filtering the positional data to obtain positional data and associated timing data relating to the movement of a plurality of devices along the or each given navigable element. The step of obtaining the positional data relating to the movement of devices along the or each navigable element may be carried out by reference to the electronic map data indicative of the navigable network. The method may involve the step of matching positional data relating to the movement of devices in a geographic region including the navigable network to at least the or each navigable element being considered in accordance with the described embodiments.

In some arrangements the step of obtaining the positional data may comprise accessing the data, i.e. the data being previously received and stored. However, preferably, the method may comprise receiving the positional data from the devices. In embodiments in which the step of obtaining the data involves receiving the data from the devices, it is envisaged that the method may further comprise storing the received positional data before proceeding to carry out the other steps of the described embodiments, and optionally filtering the data. The step of receiving the positional data need not take place at the same time or place as the other step or steps of the method.

The positional data used in accordance with the described embodiments is collected from one or more, and preferably multiple devices, and relates to the movement of the devices with respect to time. Thus, the devices are mobile devices. It will be appreciated that at least some of the positional data is associated with temporal data, e.g. a timestamp. For the purposes of the described embodiments, however, it is not necessary that all positional data is associated with temporal data, provided that it may be used to provide the information relating to the movement of devices along a navigable segment in accordance with the described embodiments. However, in some embodiments all positional data is associated with temporal data, e.g. a timestamp. It will be appreciated that timing data may be associated with a "trace" including a set of positional data "fixes" obtained by a device, rather than directly with each individual positional data fix. For example, each positional data "fix" may be associated with an offset relative to a time associated with a trace.

The positional data and associated timing data relates to the movement of the devices, and may be used to provide a positional "trace" of the path taken by the device. As mentioned above, the data may be received from the device(s) or may first be stored. The devices may be any mobile devices that are capable of providing the positional data and sufficient associated timing data for the purposes of the described embodiments. The device may be any device having position determining capability. For example, the device may comprise means for accessing and receiving information from WiFi access points or cellular communication networks, such as a GSM device, and using this information to determine its location. In some embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

The device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus. Of course, the positional data may be obtained from a combination of different devices, or a single type of device.

The positional data obtained from the plurality of devices is commonly known as "probe data". Data obtained from devices associated with vehicles may be referred to as vehicle probe data (or sometimes as floating car data). References to "probe data" herein should therefore be understood as being interchangeable with the term "positional data", and the positional data may be referred to as probe data for brevity herein.

The sample volume, along with the selected average penetration rate, may be used to estimate either (or both) of a traffic volume or traffic density for a segment (or preferably for multiple segments) within the region. Traffic volume and traffic density are both important parameters for characterising the state of the traffic in the network and may be used for a variety of traffic planning and control applications.

The described embodiments allow estimates of traffic volume to be made for any segments within the network for which a suitable scaling coefficient may be obtained in accordance with the methods described herein. That is, so long as there is sufficient probe data, it is possible to reliably estimate a scaling coefficient, and hence traffic volume over a relatively wider area of the network, and at lower cost, than typically would be possible with traditional methods. For instance, and preferably, a scaling coefficient, and hence traffic volume may be determined for a plurality (or all) of the segments within the region so that a picture of the traffic volume throughout the region may be provided. Thus, the methods described herein may be repeated to one or more further segment representing a navigable element of the navigable network. For example, the methods may be performed at least in relation to each one of a subset of segments for which traffic detector data is unavailable i.e. for a subset of segments which are not associated with at least one traffic detector.

The method comprises the step of obtaining data indicative of an estimated traffic volume for a segment in respect of the given time interval. The method may comprise generating data indicative of the estimated traffic volume for output. The method may comprise associating data indicative of the estimated traffic volume with data indicative of the segment. Thus, the traffic volume data may be associated with the electronic map data. In some embodiments, the described embodiments comprise transmitting and/or storing and/or displaying the traffic volume data to a user. That is, the traffic volume data may be provided as output to a user. Where the methods described herein are performed by a server, the method may comprise the server transmitting data indicative of the estimated traffic volume for the segment to a device associated with a user and/or vehicle e.g. a navigation device. As described above, a navigation device refers to a device running a navigation application.

It will be appreciated that the methods in accordance with the described embodiments may be implemented at least partially using software. It will thus be seen that, when viewed from further aspects and in further embodiments, the described embodiments extend to a computer program product comprising computer readable instructions adapted to carry out any or all of the method described herein when executed on suitable data processing means. The described embodiments also extend to a computer software carrier comprising such software. Such a software carrier could be a physical (or non-transitory) storage medium or could be a signal such as an electronic signal over wires, an optical signal or a radio signal such as to a satellite or the like.

Any reference to comparing one item to another may involve comparing either item with the other item, and in any manner.

It should be noted that the phrase "associated therewith" in relation to one or more segments or elements should not be interpreted to require any particular restriction on data storage locations. The phrase only requires that the features are identifiably related to an element. Therefore association may for example be achieved by means of a reference to a side file, potentially located in a remote server.

Where not explicitly stated, it will be appreciated that the described embodiments in any aspects may include any or all of the features described in respect of other aspects or embodiments of the described embodiments to the extent they are not mutually exclusive. In particular, while various embodiments of operations have been described which may be performed in the method and by the system or apparatus, it will be appreciated that any one or more or all of these operations may be performed in the method and by the system or apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments will now be described, by way of example only, with reference to the accompanying drawings, in which.

DETAILED DESCRIPTION

A system which may be used to facilitate understanding of the context of the described embodiments will now be described by reference to FIGS. 1-5. Embodiments will now be described with particular reference to a Portable Navigation Device (PND). It should be remembered, however, that the teachings of the described embodiments are not limited to PNDs but are instead universally applicable to devices able to transmit probe data samples to a server, including, but not limited to, any type of processing device that is configured to execute navigation software in a portable manner so as to provide route planning and navigation functionality. Some exemplary such devices are described below by reference to FIGS. 6 and 7. It follows therefore that in the context of the present application, a navigation device is intended to include (without limitation) any type of route planning and navigation device, irrespective of whether that device is embodied as a PND, and includes a device integrated into a vehicle such as an automobile, or indeed a portable computing resource, for example a portable personal computer (PC), a mobile telephone or a Personal Digital Assistant (PDA) executing route planning and navigation software. The described embodiments are also applicable to devices which may transmit probe data samples which may not necessarily be configured to execute navigation software, but which transmit probe data samples and are arranged to implement the other functionality described herein.

Further, the described embodiments are described with reference to road segments. It should be realised that the described embodiments may also be applicable to other navigable segments, such as segments of a path, river, canal, cycle path, tow path, railway line, or the like. For ease of reference these are commonly referred to as a road segment.

It will also be apparent from the following that where route planning is performed, this may occur even in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
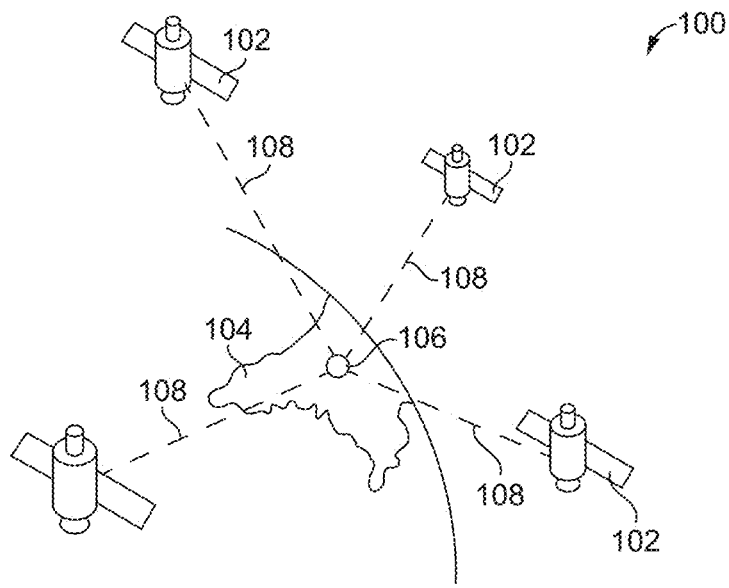
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
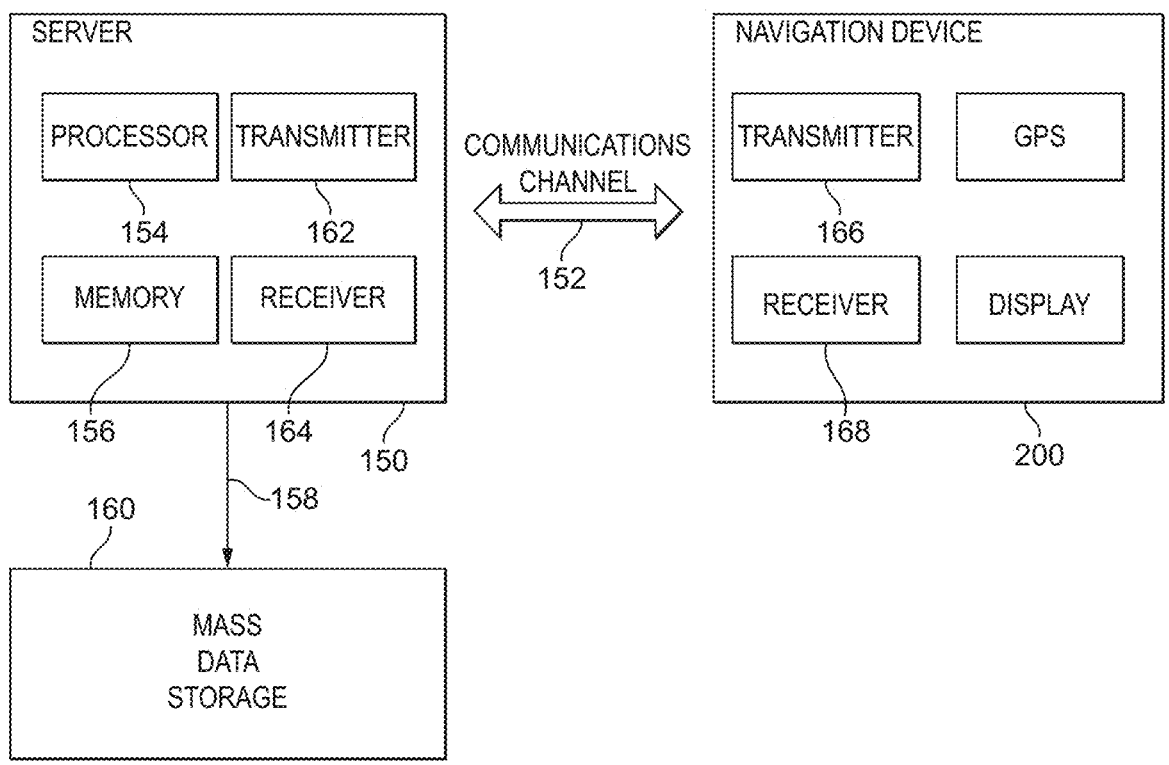
FIG. 2 is a schematic diagram of a communications system for communication between a navigation device and a server.

Turning to FIG. 2, a navigation device 200 (e.g. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
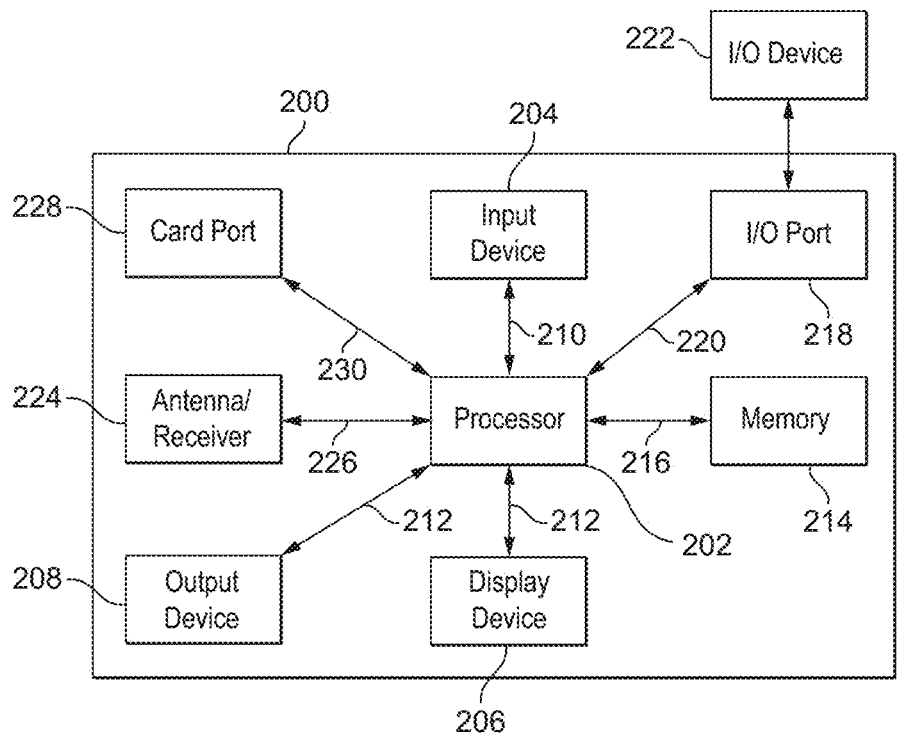
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or an input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
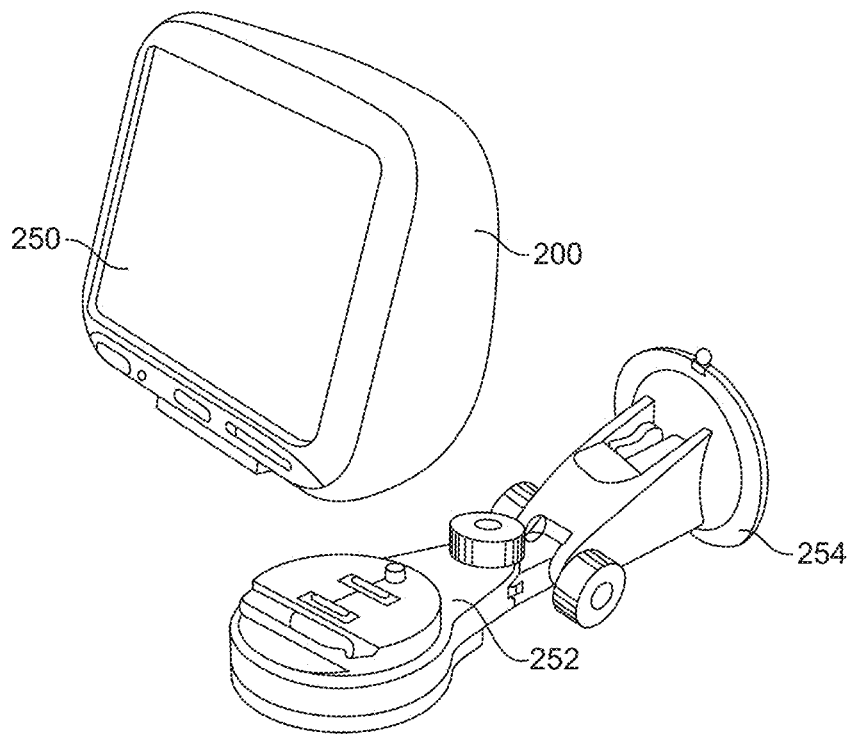
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard, window or the like using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

Of course, the navigation device need not be provided by a PND type device as illustrated. A wide range of general computing devices may, when running a navigation client, as described below, provide the functionality described by reference to the navigation device 200, and may communicate with a server in the same manner.

Figure 5:
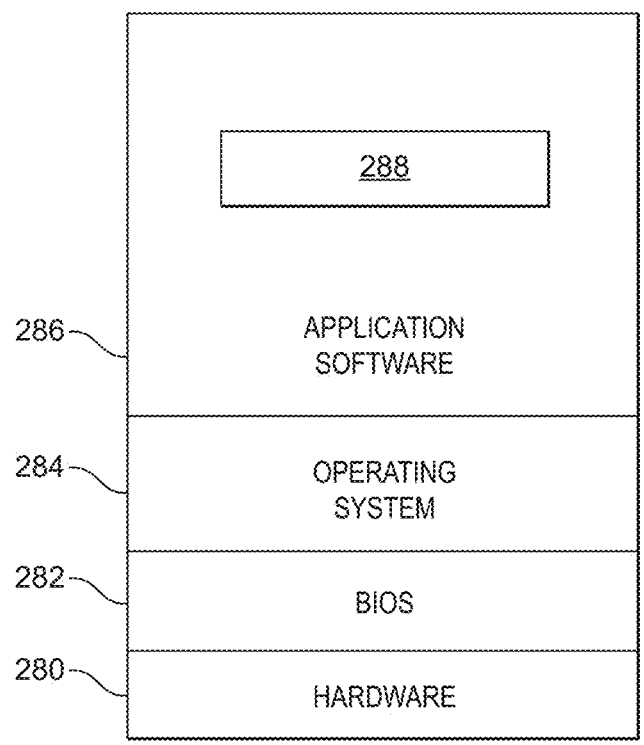
FIG. 5 is a schematic representation of an architectural stack employed by the navigation device of FIG. 3.

Turning to FIG. 5, the processor 202 and memory 214 cooperate to support a BIOS (Basic Input/Output System) 282 that functions as an interface between functional hardware components 280 of the navigation device 200 and the software executed by the device. The processor 202 then loads an operating system 284 from the memory 214, which provides an environment in which application software 286 (implementing some or all of the described route planning and navigation functionality) can run. The application software 286 provides an operational environment including the Graphical User Interface (GUI) that supports core functions of the navigation device, for example map viewing, route planning, navigation functions and any other functions associated therewith. In this respect, part of the application software 286 comprises a view generation module 288.

In the embodiment being described, the processor 202 of the navigation device is programmed to receive GPS data received by the antenna 224 and, when triggered in accordance with the methods described herein, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, and a time stamp. Such data is referred to herein as a probe data sample.

Further, the processor 202 is arranged to upload each probe data sample (i.e. the GPS data and the time stamp) to the server 150. The navigation device 200 may have a permanent, or at least generally present, communication channel 152 connecting it to the server 150.

In the embodiment being described, the probe data samples provide one or more trace, with each trace representing the movement of that navigation device 200 within an applicable period e.g. while traversing a given path. The server 150 is arranged to receive the received probe data samples and to store these as a record of the whereabouts of the device within the mass data storage 160 for processing. Thus, as time passes the mass data storage 160 accumulates a plurality of records of the whereabouts of navigation devices 200 which have uploaded probe data samples. The server may restructure probe data samples forming a trace e.g. by associating a common element, such as the device identifier value or the period to which the data relates, to the trace as a whole, rather than to each of the probe data samples that make up the trace. After moving common elements to the trace level, the individual probe data samples in the trace may at least contain the location values and a time offset within the period to which the trace relates (e.g. a time since start of a period or a sequence number).

As discussed above, the mass data storage 160 also contains map data. Such map data provides information about the location of road segments, points of interest and other such information that is generally found on map.

As mentioned above, the term "navigation device" as used herein should be understood to encompass any form of device running an appropriate navigation client, and is not limited to the use of a specific use PND type device as illustrated in FIG. 4. A navigation client is a software application that runs on a computer device. Navigation devices may be implemented using a wide range of computing devices. Some exemplary such devices are shown in FIG. 6.

Figure 6:
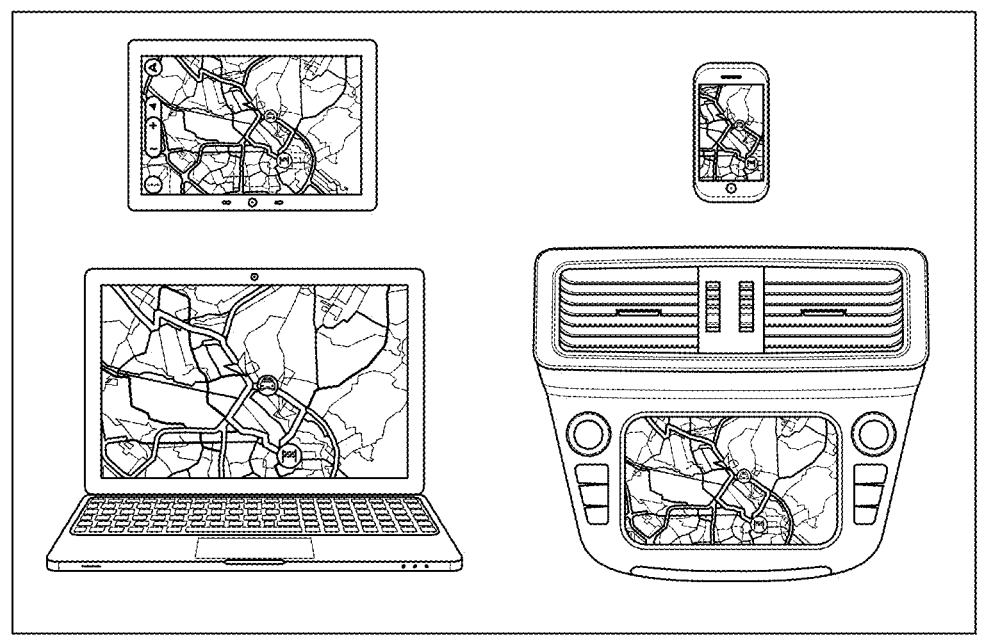
FIG. 6 illustrates various forms that a navigation device may take.

The devices in FIG. 6 all include a navigation screen for assisting a user to navigate to a desired destination. These include a personal navigation device (PND), which is a single purpose computing device (upper left), a general purpose computing device in the form of a mobile phone (top right), a laptop (bottom left) and an in-vehicle integrated computing device (bottom right). Of course, these are merely some examples of a wide range of general computing devices which may be used to run a navigation client. For example, tablets or wearable devices, such as watches may be used.

Figure 7:
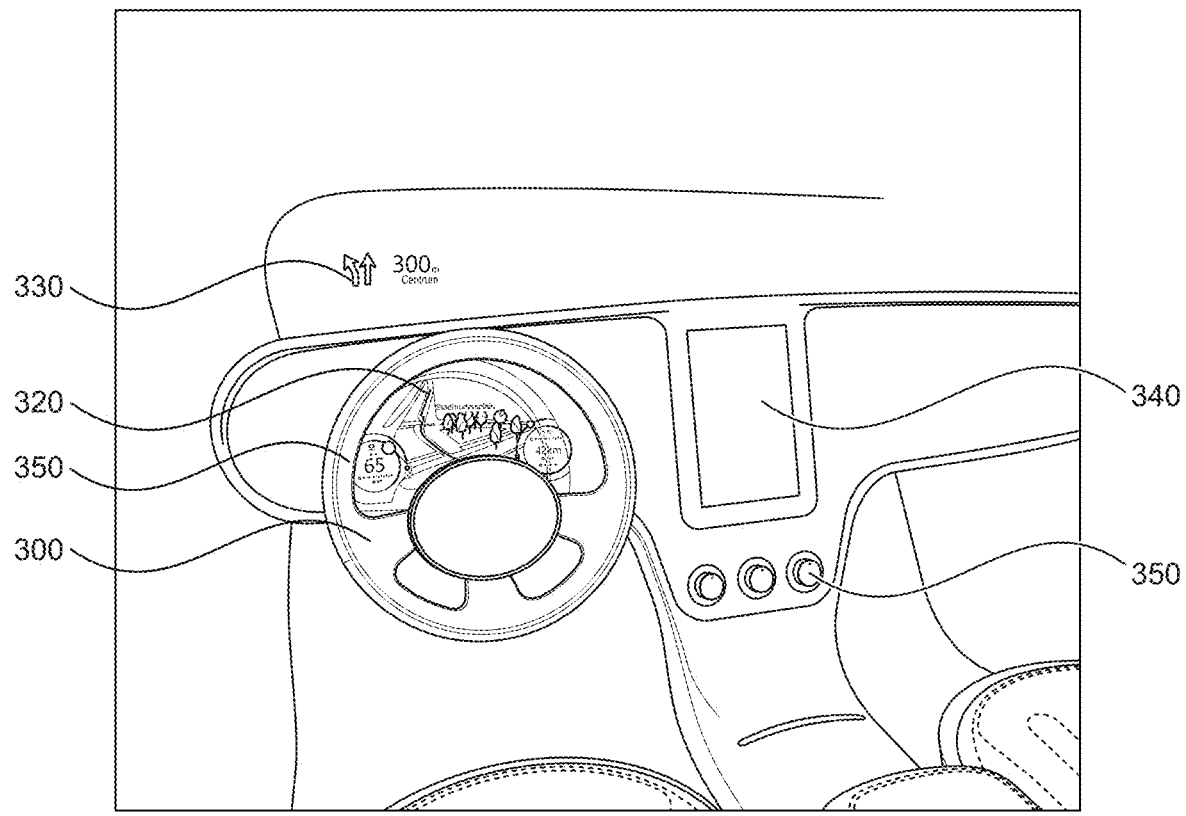
FIG. 7 illustrates various devices which may be associated with a vehicle.

A vehicle may have multiple computing devices and multiple displays in support of the driver as shown in FIG. 7. FIG. 7 shows the interior of a car with a steering wheel 300, a first display area 320 behind the steering wheel, a heads-up display 330 projected onto the front window, a centre display 340 and a plurality of controls (buttons, touch screen) 350. In addition, the car may support the adoption of mobile devices into the car computer environment.

Figure 8:
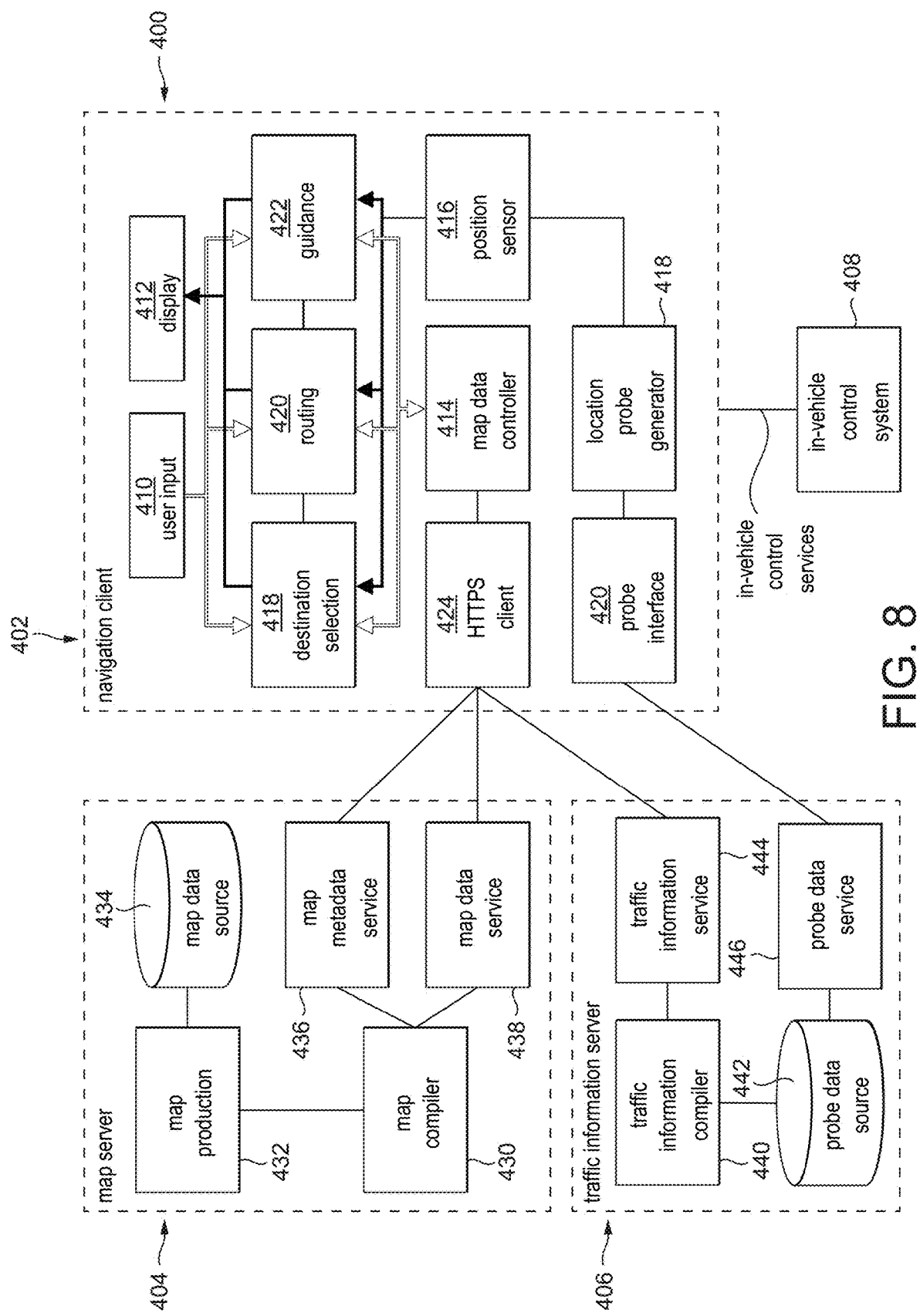
FIG. 8 illustrates another exemplary navigation system.

A functional diagram of another exemplary navigation system 400 is shown in FIG. 8. The system includes a navigation client 402, which may be provided by a software application running on any suitable computing device, as exemplified by reference to FIGS. 6 and 7. The system 400 also includes a map server 404, a traffic information server 406 and an in-vehicle control system 408. These components are described in more detail below. It will be appreciated that the navigation system will include a plurality of navigation clients 402 in communication with the map server 404 and traffic information server 406.

Navigation Client 402

The navigation client is provided by a navigation application running on a computing device. The navigation client 402 provides user input and output devices 410, 412 as common to most computing devices. The navigation client also provides a map data controller 414 that obtains and stores map data in the non-volatile memory of the computing device on which the navigation application providing the client is run. The navigation device on which the navigation application is run also includes a position sensor 416, in addition to conventional computing device components such as a processing unit, a memory, a display, a long term storage (flash memory), a networking interface. Such more conventional components are not shown in FIG. 8, which illustrates those components more relevant to supporting navigation functionality.

The navigation client 400 operates using an electronic map of a geographic area. The map information may be stored locally on the device (e.g. in non-volatile, solid state memory) or may be retrieved from a navigation server. The navigation client uses the electronic map to generate a map view of a geographic area of interest on the display of the computing device. Usually, the geographic area is centered around a current location of the computing device executing the navigation client software application.

The current location is determined using the position sensor 416, which may use any of a broad range of location sensing technologies such as satellite positioning (GPS, GNSS, . . . ), WiFi (wireless triangulation), Mobile phone tracking, BlueTooth beacons, image analysis (examples of which are described in the Applicant's PCT/EP2016/068593, PCT/EP2016/068594, PCT/EP2016/068595, and PCT/IB2016/001198, the entire content of which is herein incorporated by reference), Map matching, Dead reckoning, and other position sensing techniques. In the presence of position sensing errors map matching may be used to adjust the measured position(s) to best match a road segment on a map.

The navigation client 402 can assist a user with navigating from the current location to a destination location. The destination can be entered using a destination selection module 418. A routing module 420 of the navigation client calculates the route to the selected destination. The routing module 420 also obtains current traffic information in addition to the electronic map to determine an estimated travel time or an estimated time of arrival. The current traffic information describes the current situation on the road network in the geographic area of the electronic map. This includes current average speed, current traffic density, current road closures and so on. The routing module 420 may present a preferred route as well as alternative routes enabling the end-user to select a preferred route.

A guidance module 422 of the navigation client uses the selected preferred route to guide the end-user to the selected destination. It may use the display showing the map and a part of the route to the destination. The guidance also may take the form of additional graphical indications on the display. Most navigation clients also support audio guidance with turn by turn instructions.

Active navigation clients generate location probes and provide these to the traffic information server that uses these probes to calculate and update the traffic information. The navigation client 402 includes a location probe generator 418 and a probe interface 420 for implementing these functions.

The navigation client 402 also includes an HTTPS client for communicating with the map server 404 and traffic information server 424.

Map Server 404

The map server 404 is an infrastructure for storing, managing and creating a large amount information for creating electronic maps and the use of the electronic maps for navigation. The map server may be provides by a cloud server system.

The map server 404 includes a map compiler 430 that receives map data from a suitable map production unit 432. The map production unit 432 receives map source data from map data source 434 and converts this into a suitable format for inclusion in the electronic map. For example, the map compiler 430 may sort map data into respective layers and tiles for an electronic map. The map server 404 further includes a map data service 436 and a map metadata service 436. The combination of map data service 436 and map metadata service 436 may together be referred to as a "cloud service". The HTTPS client 424 may retrieve map metadata from the map metadata service 436, and then, as required, may use the metadata to retrieve the map data from the map data service 438.

A typical navigation server manages map information associated with $10^7$-$10^8$ kilometre of road networks for a wide range of countries (around 200 countries). The map information needs to be of high quality, so the server infrastructure processes updates to the map information, with an update rate averaging around 1000 updates per second. In addition the map information needs to be distributed to a global infrastructure of navigation clients. The distribution requires a sophisticated content distribution network in addition to cloud computing systems to generate the map information to be distributed. The navigation server also aggregates, processes and distribute real time traffic information.

Traffic Information Server 406

The traffic information server 406 includes a traffic information compiler 440 which compiles traffic information using data obtained from a probe data source 442. The probe data source 442 receives data from a probe data service 446, which, in turn, is configured to receive probe data from navigation clients. The traffic information compiler 440 provides traffic information to a traffic information service 444, which communicates with the HTTPS client 424 to provide traffic information thereto.

The traffic information server 406 provides road and traffic information to the navigation client 402.

Map information usually contains static traffic information based on historic data. For more dynamic traffic information such as traffic densities, parking availability, accidents, road closures, updated road signs, and points of interest, the traffic information server receives location probe data from navigation clients. The traffic information compiler uses the current location probe data obtained from multiple navigation clients to generate current traffic information.

Location Probe Data

During normal operation the navigation client 402 periodically sends location probe data to the traffic information server 406. The location probe data comprises information about a recent or current location of the navigation client. The location probe data may be combined into a set of probe data elements, usually referred to as a trace. The traffic information server 406 uses the trace or the probe data to estimate current traffic information. This information comprises parameters for road segments such as current average speed and current traffic density. The traffic information server 406 processes the location probe data to provide real time traffic information to the navigation client 402 enabling better route generation and improving estimated travel times to a destination.

The term location probe (or 'probe') refers to a data sample including at least positional information, indicative of a position of the navigation client i.e. the device implementing the client. Typically the position data will include a longitude value and a latitude value (both with a typical accuracy of around 10 meters). The probe data sample may include other data, such as a time value. The time value provides a time associated with the position data, and may be received from the positioning system, so as to correspond to the time at which the position data was generated, or may correspond to the time of transmission of the probe data sample. The probe data sample may also include a device identifier value (uniquely associated with an end-user device and a user).

The term trace describes a set of location probes that are associated with the same device, user, and a common period. The trace data can be restructured at the server e.g. by associating a common element such as the device identifier value or a time period to which the probe data relates to the trace rather that to each of the probes that make up the trace. After moving common elements to the trace level, the individual probes in a trace at least contain the location values and a time offset within the period (e.g. a time since start of a period or a sequence number).

The described embodiments are, in some embodiments at least, directed to methods of generating data indicative of traffic volume within a navigable network. Accurate generation of such traffic data is important for many traffic management and control applications. The described embodiments thus provide an improved method for generating such traffic data. In particular, the described embodiments provide methods for generating such traffic data from probe data. An embodiment will now be described with regard to estimating traffic volumes. Such techniques may be performed by a server having access to vehicle probe and measured traffic count data as described below. For example, the server may be a traffic server operating in a system of the type described by reference to FIG. 8.

The traffic volume (also referred to as traffic flow) is defined as the number of vehicles ΔN passing through a cross-section at a location x within a time interval Δt. That is, the traffic volume Y is generally given by:

$$Y = \frac{\Delta N}{\Delta t} \qquad \text{(Equation 3)}$$

The time interval Δt may generally be set or selected as desired depending on the application and e.g. the required time resolution (and accuracy). For instance, in the context of dynamic traffic phenomena such as traffic jams typical aggregation time intervals Δt may suitably range from between about 1 minute to 1 hour. However, for other applications, such as calibration of traffic lights, traffic planning, etc., much larger time intervals may need to be considered, e.g. days, weeks or even months.

Traffic volumes cannot normally be measured directly from probe data as only a fraction of the total vehicles on the road network are reporting data. That is, the probe data represents only a certain sample of the total traffic within the road network. Although the percentage of probes is generally increasing, at present, the coverage (or "penetration level") is typically only about 10% (e.g. in Germany or the Netherlands), and even less in some areas.

The described embodiments thus provide improved methods wherein traffic volumes can be estimated using probe data from a sample of floating vehicles. The basic idea underlying this concept is that given an appropriate scaling coefficient (which may be inversely indicative of penetration level), the observed probe count for a segment in a given time interval can be projected or extrapolated to give the total traffic volume for the segment in that time interval.

Figure 9:
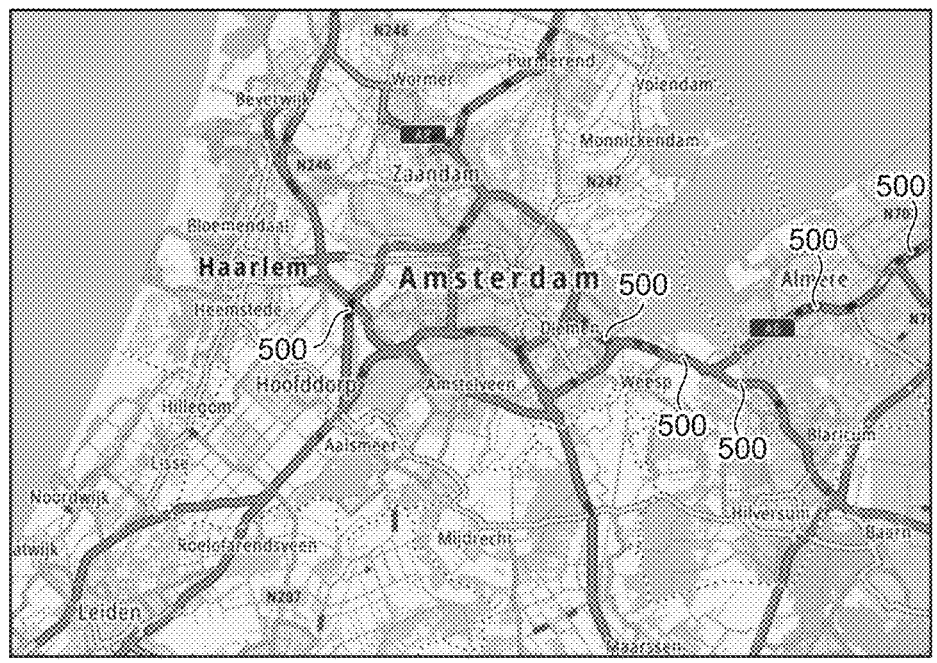
FIG. 9 illustrates the number of road segments having a traffic flow detector in a given map area.
Figure 10:
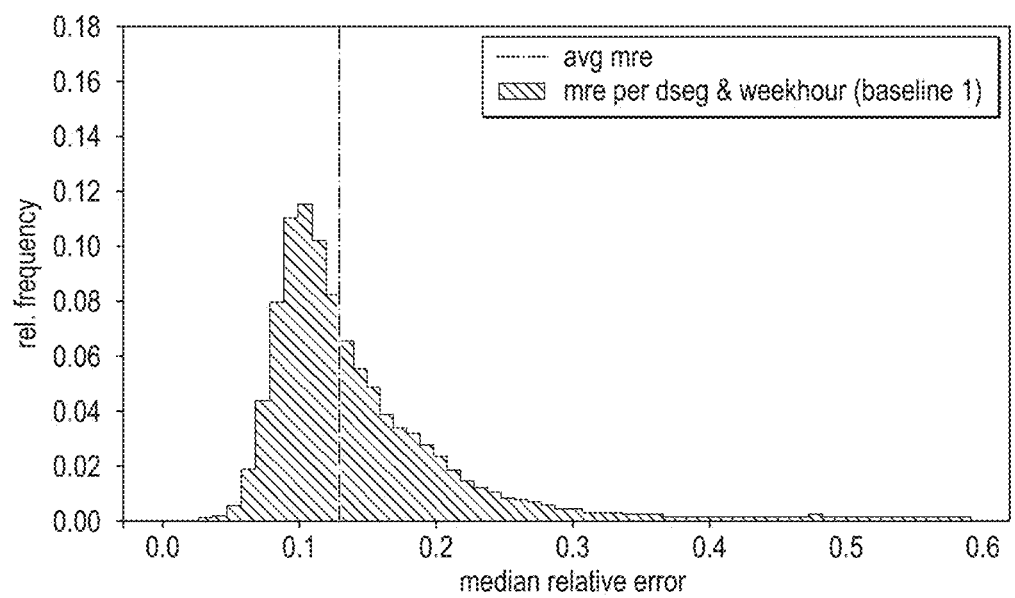
FIG. 10 illustrates observed errors between estimated and measured traffic flow using a constant scaling coefficient.

The described embodiments are concerned with an improved technique for estimating such a scaling coefficient. The scaling coefficient is time dependent, and/or location dependent. As illustrated by reference to FIG. 9, described above, current techniques rely upon a scaling coefficient that is constant across all segments of the map and for all times considered. However, as FIG. 10 shows, this may lead to considerable error.

Some embodiments will now be described by reference to a method that is implemented by a traffic information server.

The traffic information server uses vehicle probe data and measured traffic data obtained from traffic detectors associated with road elements represented by segments of an electronic map to provide an improved estimate of the scaling coefficient for a segment in a given time interval. Such measured traffic data will, for simplicity, be referred to as "Induction loop data", although it will be appreciated that the measured traffic data may be obtained from any other types of traffic detector associated with the road elements i.e. forming part of the fixed road infrastructure, such as cameras, rather than probe data.

The traffic information server receives vehicle probe data for a set S of road segments s in a map area A. The set of road segments S comprises a first subset L={$s_i$|0≤i<N} containing N road segments $s_i$ for the map area A. Each road segment $s_i$ of this first set is associated with a traffic flow detector.

The remaining road segments in this map area form a second subset M={$s_r$|0≤i<R} of R road segments $s_r$ that have no association with a traffic flow detector. Thus, L={$s_i$|0≤i<N} and M={$s_r$|0≤r<R} and S=L∪M with |S|=N+R.

The traffic information server receives measured traffic flow data Y($s_i$,t) from a traffic detector for a road segment $s_i$. The traffic information server further receives probe data X($s_i$,t) from navigation devices associated with vehicles travelling on the road segment $s_i$. The navigation devices may be any devices running navigation applications as discussed above.

As both traffic flow data sources are time dependent and location (road segment) dependent, the traffic information server determines a scaling coefficient k($s_i$,t) that also is a function of time t and location $s_i$. The scaling coefficient is indicative of penetration level;

$$k(s_i, t) = \frac{Y(s_i, t)}{X(s_i, t)} \qquad \text{(Equation 4)}$$

The k($s_i$,t) coefficient links the received measured traffic flow data obtained by traffic detectors associated with segments and the received probe data obtained from navigation devices.

However, the traffic information server does not receive measured traffic flow data for the second set of road segments $s_r$. Instead, the traffic information server only receives probe data $X(s_r,t)$ from navigation devices associated with vehicles travelling on the road segment $s_r$.

In equation 4, the time t represents time in fixed time units of $\Delta t$. This means that a high resolution time T (e.g. counting microseconds since a reference time) may be converted to t with $t=\text{trunc}(T/\Delta t)$. Thus, t counts the number of time intervals $\Delta t$ since the reference time. Using 1 hour as $\Delta t$, the time t is an hourly time indicator in which t has an accuracy of 1 hour. As traffic patterns are very similar for the same time and weekday, a common simplification is to replace time with a discrete time index $t_k$ covering the 24×7 hours in one week. The time index $t_k$ counts the Z time intervals $\Delta t$ in one week. The formula $t_k=t \mod Z$ uses the modulo operation to map the time t to the time index $t_k$ with a the range of 0, . . . , Z–1 ($0 \leq k < Z$). If $\Delta t$ is 10 minutes, the value for Z is 24*7*(60/10)=1008. For a $\Delta t$ of 1 hour (60 minutes), Z equals 168 (24*7).

What is required is a method to determine $k(s_r,t_k)$ for a road segment $s_r$ for which there is no measured traffic information.

In a simple embodiment, time dependent values of the scaling coefficient determined for segments which are associated with induction loops, through comparison of traffic count data based on probe data and measured induction loop data, may be used to infer time dependent scaling coefficient values for use in determining a traffic volume for segments for which there is no measured traffic information. This provides some improvement in the accuracy with which a traffic volume for such segments may be determined in comparison to using a constant scaling coefficient across all segments.

In an experiment using a two sets of induction loops, the $k(t_k)$ coefficients were calculated from a first set of induction loops. These $k(t_k)$ coefficients are discrete time dependent but location independent, i.e. they are used for all road segments. The measured traffic data for a second set of induction loops is then compared with the traffic estimate using the probe data for these induction loops and the $k(t_k)$ coefficients. Using the discrete time dependent coefficients $k(t_k)$ reduced the mean relative prediction error (MRE) to 10.5%, compared to an MRE of 12.9% for a constant coefficient k.

Figure 11:
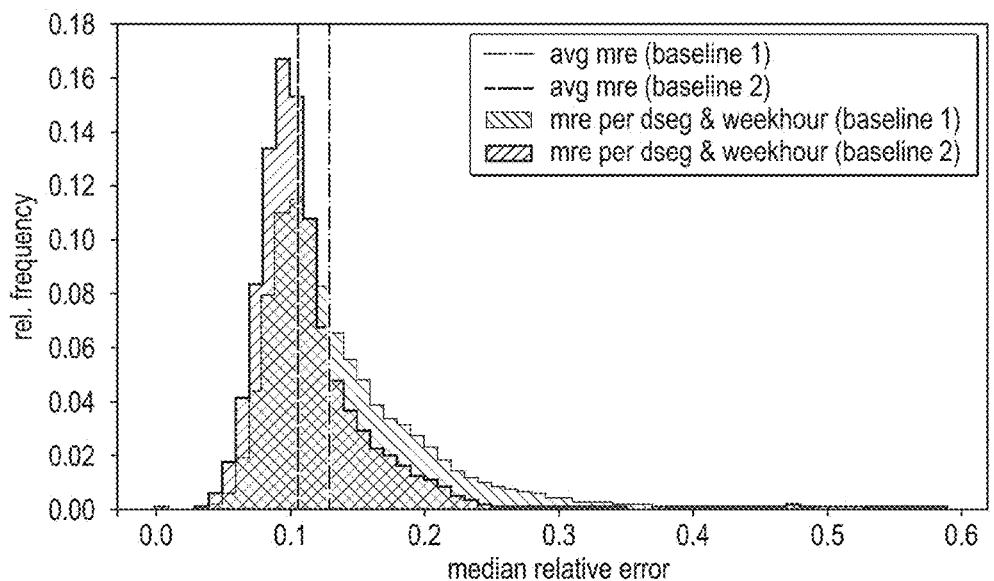
FIG. 11 illustrates observed errors when using time dependent but location independent scaling coefficients.

FIG. 11 shows the median relative error for a constant coefficient k and discrete time dependent coefficients $k(t_k)$ for the same sets of induction loops. Increased granularity of the coefficients thus improves the accuracy of the traffic estimates. A further refinement of the granularity would ideally involve consideration of the location of the road segment for estimating its traffic flow. It is therefore desirable that estimation of the scaling coefficient is dependent upon position e.g. the position of segments considered. Some techniques for implementing this are described below.

The traffic information server receives measured traffic data $Y(s_i,t_k)$ from a traffic detector and probe data $X(s_i,t_k)$ from navigation devices associated with vehicles for a road segment $s_i$.

The traffic information serves divides the received measured traffic data $Y(s_i,t_k)$ with the received probe data $X(s_i,t_k)$ to obtain $k(s_i,t_k)$ as per equation 4 above. The $k(s_i,t_k)$ coefficients for road segment $s_i$ may be used later to estimate the traffic flow for the road segment $s_i$ from the probe data $X(s_i,t_k)$ in the absence of measured traffic data $Y(s_i,t_k)$.

The traffic information server only receives probe data $X(s_r,t_k)$ from navigation devices associated with vehicles travelling for a road segment $s_r$. It is an objective to determine $k(s_r,t_k)$ for such road segments $s_r$ that have no association with a traffic flow detector, but for which the traffic information server receives probe data $X(s_r,t_k)$.

The traffic information server uses the probe data $X(s_r,t_k)$ and $X(s_i,t_k)$ to generate traffic pattern profile a $P(s)$, referred to herein as "the probe profile". The probe profile describes the variation of the probe count i.e. count of vehicles according to the probe data, with respect to time over the week. This profile is obtained by aggregating probe data relating to weekly recurrent time intervals e.g. 1 hour intervals. The probe profile thus describes a weekly pattern of the probe data as shown in FIG. 12.

Figure 12:
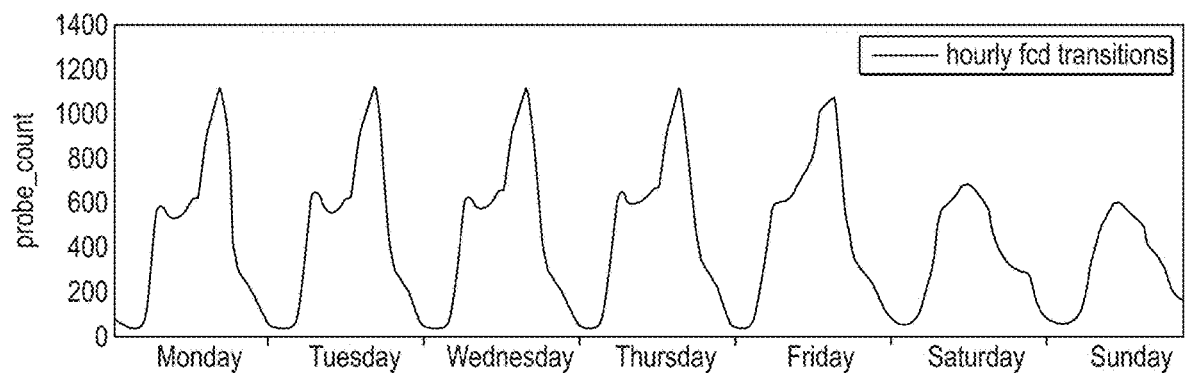
FIG. 12 illustrates an exemplary probe profile illustrating a weekly pattern of probe data.

FIG. 12 shows the number of probes for a road segment as a function of time index $t_k$ that counts the number of time intervals in a day and for each day of the week. The profile shows the number of probes $X(s_r,t_k)$ with $0 \leq k < Z$ where Z is the number of time intervals in a week. As the traffic information server receives probe data for all road segments $s_r$ and $s_i$, it can generate a probe profile $P(s)$ for all these road segments.

$$P(s)=X(s,t_{k \mod z}) \text{ with } s \in \{s_r | r=0 \ldots N\} \cup \{s_i | i=1 \ldots M\} \quad \text{(Equation 5)}$$

Equation 5 shows that there are Z elements in a probe profile. For the map area there are N+M road segments for which the traffic information server receives probe data. The number of probe counts for each element of the probe profile is the mean of each different week that is considered when building a profile.

The traffic information server uses the probe profile for road segments to determine a parameter indicative of profile similarity. The similarity value establishes links between a road segment $s_r$ of interest and all road segments with a traffic detector $\{s_i | i=1 \ldots M\}$. The road segments with a traffic detector may be referred to as "reference segments". In other words a probe profile of a road segment that has no association with a traffic flow detector is matched to each of the probe profiles of road segments $s_i$ with a traffic detector (reference probe profiles). The matching in turn drives the estimation of $k(s_r,t_k)$.

Finding a similarity between probe profiles $P(s_1)$ and $P(s_2)$ is implemented using a non-negative kernel function $K(a,b)$ (not to be confused with the coefficient $k(s,t)$ function) that accepts two vectors arguments and outputs a single real number in the range (0 . . . 1] or $0 < K(a,b) \leq 1$. A kernel function result of 1 is generated if and only if a=b (identical vectors) otherwise a value in the range (0 . . . 1] is returned. The $K(P(s_1), P(s_2))$ kernel function maps the similarity of two probe profiles $P(s_1)$ and $P(s_2)$ to a real valued function result. The profile $P(s_j)$ is a vector with dimension Z: $P(s_j)=[X(s_j,t_0),X(s_j,t_1), \ldots , X(s_j,tz)$.

As an example, the kernel function may be a radial basis function, i.e. $K(\vec{a},\vec{b})=\|\vec{a}-\vec{b}\|$. In particular, the kernel function is a Radial Basis Function kernel:

$$K(\vec{a},\vec{b}) = e^{-\gamma \|\vec{a}-\vec{b}\|^2} \text{ with } \gamma = \frac{1}{\sigma^2}.$$

Figure 13:
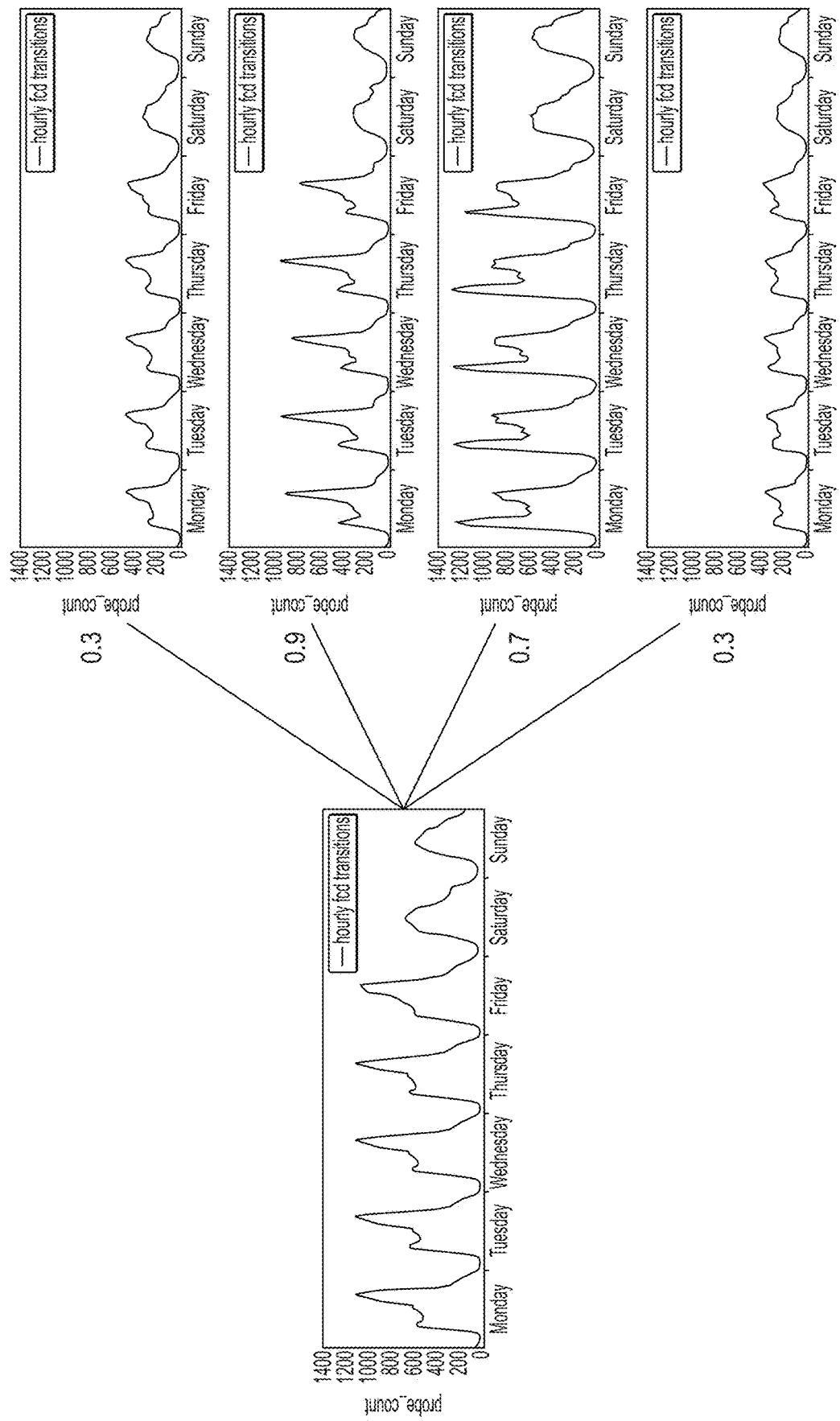
FIG. 13 shows the similarity between a probe profile (which may be associated with a segment of interest) and four (reference) probe profiles.

The similarity between profiles, and the way in which a similarity parameter may be determined, is shown in FIG. 13.

FIG. 13 shows the similarity between a left most probe profile (which may be associated with a segment of interest) and four (reference) probe profiles on the right. The left probe profile has a distinct peak near the end of the day (indicating evening traffic congestion). The similarities are used to obtain a similarity parameter indicative of the similarity between the probe profile associated with the segment of interest and each reference profile. These similarity parameters are in the range 0.3 . . . 0.9 from a maximum range 0 . . . 1. In other words, the parameters are normalized.

The probe profile similarities between a probe profile for a road segment $s_r$ and the reference probe profiles from the set L (representing road segments associated with a traffic flow detector) are used to estimate the coefficient $k(s_r,t_k)$ for the road segment $s_r$.

$$Y(s_r, t_k; \alpha) = \sum_{i=0}^{N} \alpha_i K(P(s_i), P(s_r))k(s_i, t_k))X(s_r, t_k) \quad \text{(Equation 6)}$$

Equation 6 shows a weighted contribution of the $k(s_i,t_k)$ coefficients (see equation 3) using a similarity measure $K(P(s_i), P(s_r))$ and a weighting coefficient $\alpha_i$.

The weighting coefficients are obtained from training a linear regression model using the ground truth data $Y(s_i,t_k)$, i.e the measured traffic data for the road segment $s_i$. Advantageously (although by illustration and not limitation), an L2 penalised ridge regression model is used for the regression function $Q(\alpha)$:

$$Q(\alpha) = \sum_{i=0}^{N}\sum_{k=0}^{Z} l(Y(s_i, t_k; \alpha), Y(s_i, t_k)) + C\|\alpha\|^2 \quad \text{(Equation 7)}$$

In equation 7 the constant C relates to the regularization term that is found by cross validation. The regression model uses a standard quadratic loss function $l(x, y)=\|x-y\|^2$.

The above describes an example of generating a set of traffic volume estimates $Y(s,t_k;\alpha)$ for road segments s in a map area for which the traffic information server receives probe data $X(s,t_k)$. Equation 4 describes that the received probe data $X(s,t_k)$ and the traffic volume estimate $Y(s,t_k;\alpha)$ for the road segment s are linked through the coefficients $k(s,t_k)$.

Equation 4 and equation 6 result in the following equation for the coefficients.

$$k(s_r, t_k; \alpha) = \sum_{i=0}^{N} \alpha_i K(P(s_i), P(s_r))k(s_i, t_k) \quad \text{(Equation 8)}$$

Equation 8 and equation 6 are linked using $Y(s,t_k;\alpha)=k(s,t_k;\alpha)X(s,t_k)$. This means that the process for determining $\alpha$ also can be formulated in terms of the coefficients $k(s,t_k;\alpha)$.

Figure 14:
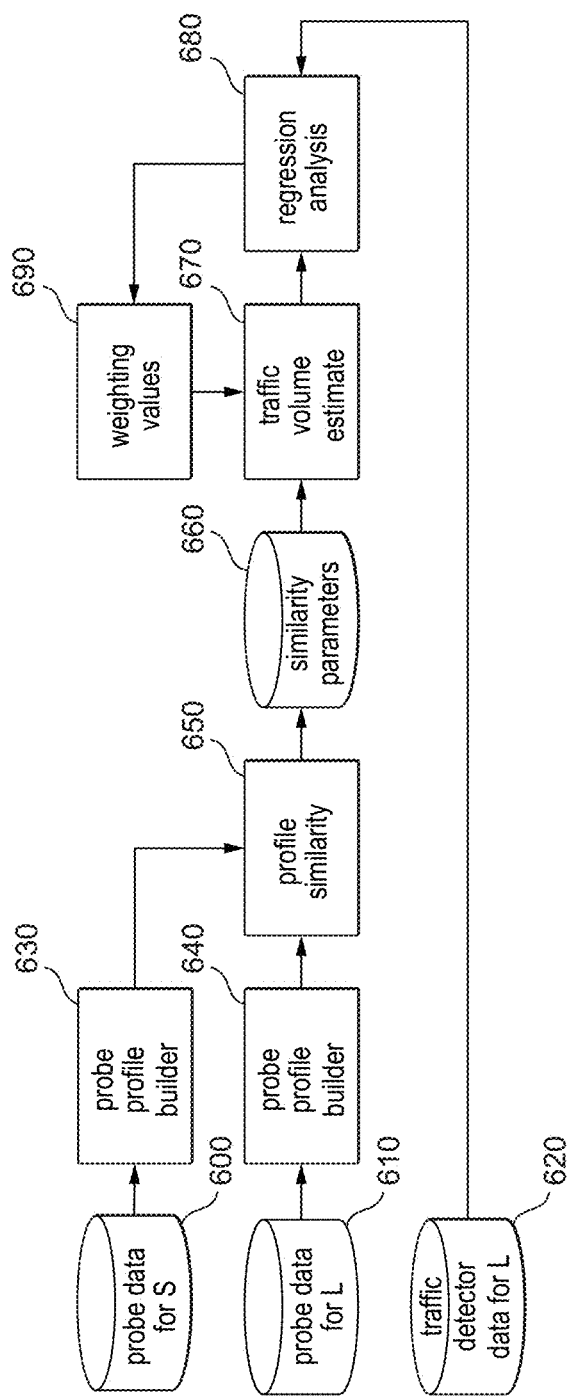
FIG. 14 is a functional diagram illustrating one system for implementing the generation of the set of scaling coefficients in accordance with the embodiments described herein.

FIG. 14 is a functional diagram illustrating one system for implementing the generation of the set of scaling coefficients in accordance with the embodiments described herein.

Figure 15:
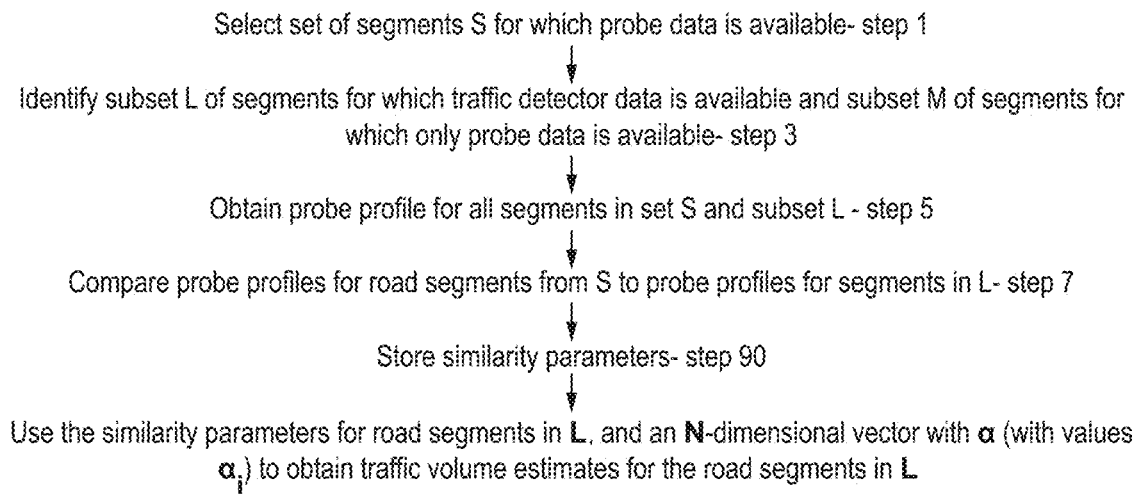
FIG. 15 is a flow chart illustrating one method for obtaining a time dependent scaling coefficient using the system of FIG. 14.

An embodiment of a method for obtaining a time dependent scaling coefficient using such a system will now be described by reference to FIG. 15.

FIG. 14 shows the probe data and the traffic detector data that the traffic information server receives.

In step 1 the traffic information server selects a set S of road segments s in a map area A for which it receives probe data probe data (600 in FIG. 14). These may be segments in a given map area of interest. In step 3 the server identifies a subset L of road segments from the set S for which traffic detector data is also available, and a subset M of road segments for which only probe data is available (similar to the earlier description above). The probe data and traffic detector data for segments in subset L are labelled 610 and 620 in FIG. 14. The relevant probe and traffic detector data may be stored in respective databases.

In step 5 the traffic information server determines a probe profile describing the probe data for a week of time intervals for each road segment in set S (using probe profile builder module 630) and each road segment in set L (using probe profile builder module 640). In step 7 the traffic server compares the probe profiles for road segments from S to the probe profiles for all road segments in the set L (using profile similarity comparison module 650), and stores the results in a similarity parameters module (660)—step 9.

In step 11 a traffic volume estimate module 670 of the traffic information server uses the similarity parameters for the road segments in L, and an N-dimensional vector with $\alpha$ (with values $\alpha_i$) to obtain traffic volume estimates for the road segments in L. A regression analysis module 680 compares the traffic volume estimates with the observed traffic volume data for all road segments in L and updates the weighting vector a (with weighting values being stored in weighting value module 690). When an optimal match is found, the final weighting vector from module 690 and the similarity parameters from module 660 are used to generate for each road segment in S a set of coefficients k describing for each time interval in the probe profile the value that converts a received probe count to an estimated traffic volume.

This method may be performed in respect of any segment of interest from S, but is particularly useful in obtaining an estimated traffic volume for any segment for which traffic detector data is not available i.e. forming part of subset M. The traffic detector data from subset L is used to verify the accuracy of the estimation function in the linear regression module. Based on the equation 8 above, it may be seen that the estimated scaling coefficient for a segment of interest in a time interval of interest forming part of subset M, for which traffic detector data is unavailable, will be based on a similarity of the probe profile for the segment of interest and reference probe profiles associated with each one of a plurality of reference segments, corresponding to segments of subset L, for which traffic detector data is available. The estimated scaling coefficient is also based upon reference scaling coefficients for each one of the reference segments, based upon a count of traversals of the segment according to probe data and measured traffic count data i.e. the measured count divided by the probe count (equation 4) in the given time interval of interest. The weight given to each such reference scaling coefficient is determined using the linear regression model, trained using the measured traffic detector data associated with segment in subset L.

Figure 16:
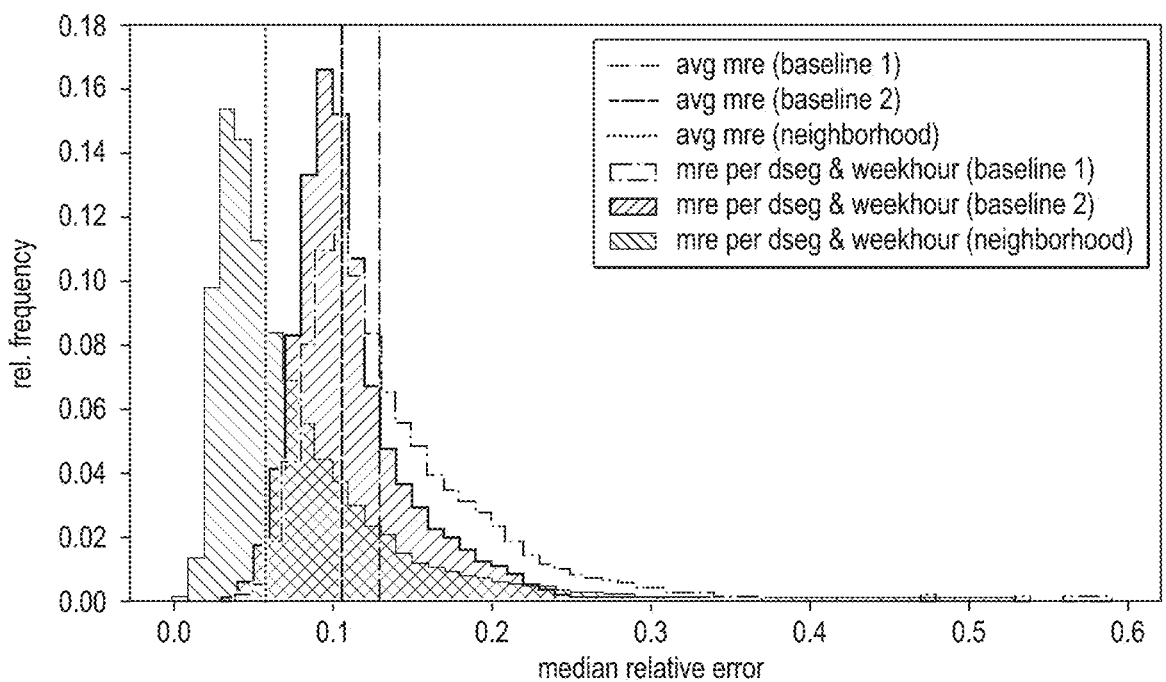
FIG. 16 illustrates observed errors when using a scaling coefficient obtained in accordance with some embodiments.

Referring to FIG. 16, an experiment with a map area where the set of road segments L is split into a two sub-sets: the first for generating the traffic volume estimations and the second for verifying the accuracy of the estimation functions, has an accuracy as shown in FIG. 16.

The figure shows the previous results (Baseline 1 and 2) and the distribution for the estimation method using the probe profile matching and weighting vector estimation (neighborhood). The volume estimates has a Median Relative Prediction Error (MRE) of 5.78% (compared to an MRE of 12.9% and 10.5% for resp Baseline 1 (FIG. 1) and Baseline 2 (FIG. 11)).

As mentioned above, to further improve accuracy, it is desirable that the scaling coefficient is also position dependent i.e. dependent upon the position of the segments.

Such a method may be performed in the following manner. As above, the following terminology is used;

S is a set of road segments s in a map area A

L={$s_i$|0≤i<N} is a set of road segments $s_i$ in a map area A for which traffic information is available. Each road segment $s_i$ is associated with a traffic flow detector M={$s_r$|0≤i<R} is a set road segments $s_r$ in the map area A that have no association with a traffic flow detector.

k(s,$t_k$) is the estimated coefficient that depends on the location of s and on the time index $t_k$.

In this further embodiment, the difference is that the estimated scaling coefficient (function) uses reference scaling coefficients (obtained using measured traffic detector data in relation to reference segments for which such data is available) in a different way.

$$k(s_r, t_k; \alpha) = \sum_{i=0}^{N} \alpha_i D(s_i, s_r) k(s_i, t_k) \quad \text{(Equation 9)}$$

In the above equation, the kernel function of equation (8) is replaced by a decay function representing the contribution of the reference (measured) scaling coefficient that reduces as a function of distance between the reference road segment and the road segment for which the estimated coefficient is being determined. The weighting values a; adjust the estimated coefficients to the average coefficient for the map area A.

Thus, rather than considering similarity between probe profiles of a segment and reference segments, and using a linear regression training model to refine weighting of reference scaling coefficients calculated for segments having traffic detector data, in these embodiments, the scaling coefficient for a segment of interest is based on reference scaling coefficients for reference segments, being segments for which measured traffic data exists, with the weight assigned to different ones of the reference scaling coefficients depending upon the distance between the reference segment and the segment of interest.

This approach spreads the difference between a measured reference scaling coefficient and the average coefficient over a number of nearby road segments.

The distance function may be based on any suitable measure of distance e.g. a Euclidian distance measured between (start/end/median) points of the road segments, a (shortest, fastest) routing distance between these points, or a distance dependent on road class. The distance function may be any function that decays to an average coefficient contribution value.

In this example, the obtained scaling coefficient for the segment of interest is additionally time dependent, with the reference scaling coefficients and hence that of the segment of interest being in respect of a given time interval. However, it is envisaged that the scaling coefficient obtained might alternatively be only position dependent.

This embodiment may be combined with the earlier embodiment e.g. to additionally take into account similarity between probe profiles of segments, or to use a linear regression model based upon measured (reference) scaling coefficient data.

In more detail, Equation 9 introduces the decay function D($s_i$,$s_r$) for estimating a scaling coefficient k($s_r$,$t_k$;α) from reference (measured) scaling coefficients k($s_i$,$t_k$) based on measured data and a normalising value α. The decay function aims to spread out the reference scaling coefficients over a certain map area (e.g. locations within a certain range). At a longer distance, the decay function result should closely approach the average of the reference scaling coefficients (based on measured data).

Figure 17:
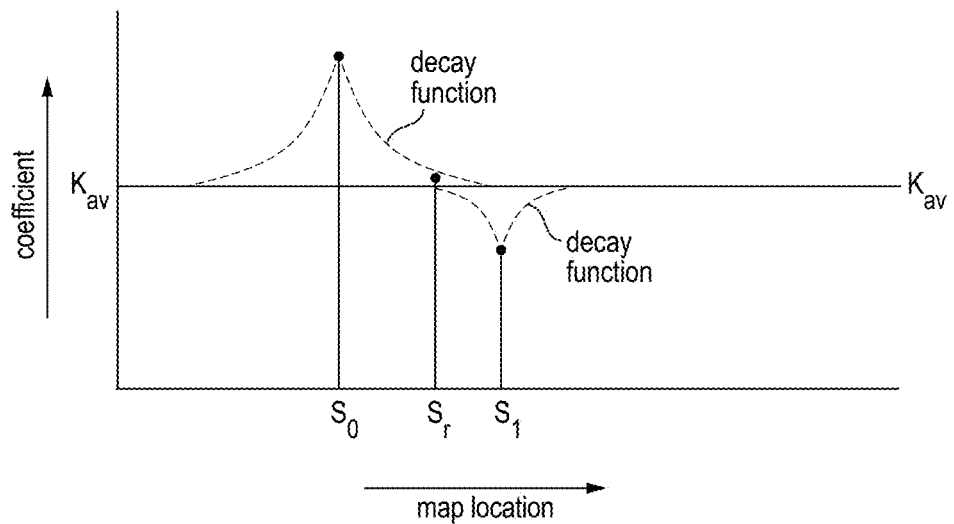
FIG. 17 illustrates an example of a decay function which may be used in obtaining a position dependent scaling coefficient.

An example of a decay function is shown in FIG. 17.

The figure shows the reference scaling coefficients for two reference segments $s_i$ and $s_{i+1}$ and the map positions associated with these reference segments. For clarity, the map locations are shown as a one dimensional map, e.g. based on a distance between the two reference segments. The figure also shows the coefficient k(s,$t_k$) for these map locations with an average coefficient $k_{av}$ (or a time dependent coefficient $k_{av}(t_k)$) over all the reference segments $s_i$. For the two reference positions, the figure also shows an example decay function used in equation 8 to calculate the coefficient k($s_r$,$t_k$;α) for a road segment $s_r$. In the figure the road segment $s_r$ is near both $s_i$ and $s_{i+1}$, the reference coefficients from these reference segments propagate to road segment $s_r$ using the decay function.

The decay function in equation 8 combines the reference scaling coefficients to obtain the estimated scaling coefficient for a road segment. For locations that are far removed from reference road segments, the contributions of all the reference scaling coefficients should approach the average $k_{av}$ of the reference scaling coefficients.

The propagation model described in equation 8 contains a vector of scaling values that scale the propagation. For example the scaling can adjust the propagation to ensure that the average over all road segments $s_r$ in a map area A is close to the average scaling coefficient for all the reference road segments $s_i$.

The decay function of the figure is merely an example. Other forms of decay function such as an exponential decay, a step-wise decay, an hyperbola decay, or an inverse distance weighting function may be used, for example. The decay preferably should occur over a relatively short range.

Figure 18:
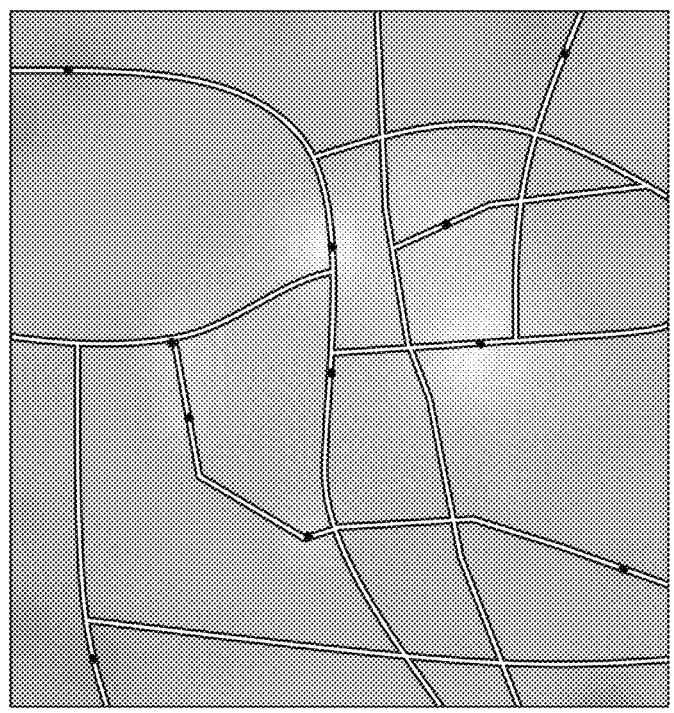
FIG. 18 shows a map area illustrating position dependent scaling coefficient values.

A two dimensional result is shown overlaying a map area in FIG. 18.

Such embodiments are shown in more detail by reference to FIG. 18. FIG. 18 shows a map area containing road segments (light grey) and traffic volume detectors (black dots). The map also shows a k(s) function for the map area. It shows the result of distributing the measured k values of the reference road segment (i.e. road segments associated with the traffic volume detectors). The figure shows the k(s) function as a "heat map" overlay for the map area. In practice, the k(s) scaling coefficients are determined based on a location associated with each road segment in the map area. For example, the location may be a start point, an end point, or a centre point of the road segment. The k(s) value for that location of the road segment is then associated with the entire road segment.

The heat map of FIG. 18, describes the estimated coefficient k(s), as it is determined using the decay function. The k(s) coefficient also may be obtained using the probe profile similarity method. In both these methods, the estimated coefficients also may be dependent on time or on the time index $t_k$, resulting respectively in the estimated coefficients k(s,t) and k(s,$t_k$). The methods for determining the estimated coefficient as a function of (map) location usually involves determining a weighting value a for scaling the contributions to the estimated coefficients.

In accordance with various embodiments, electronic map data may be provided which includes reference segments, being those segments for which measured count data is available, and "non-reference" segments for which measured count data is not available. Each "reference segment" i.e. a segment for which measured count data is available, is associated with data indicative of a reference scaling coefficient for the given time of interest. Each reference segment may be associated with a reference scaling coefficient profile representing a variation in reference scaling coefficient with respect to time, from which the scaling coefficient for a given time may be obtained.

The reference scaling coefficients may be based on a ratio of the measured traffic count and probe count for the segment for an applicable time or times.

The reference scaling coefficient for a reference segment may be based at least in part on live data. For example, this may be particularly applicable where an estimated scaling coefficient for a non-reference segment is required in respect of a current time. Alternatively or additionally the reference scaling coefficient (or scaling coefficient profile) may be based on historical data e.g. based on a historic probe profile. This may be applicable where a time of interest for which an estimated scaling coefficient is required is a past or future time, but is also applicable to current times.

Each non-reference segment may be associated with one or more reference segments. These reference segments are a subset of the reference segments of the electronic map in the area considered which it has been determined are relevant for obtaining traffic volume data in respect of the given non-reference segment. In other embodiments, where the association is not present in the map data, the method may extend to determining the associated reference segment(s) for a given segment.

The subset of the reference segments associated with a given non-reference segment may be determined as desired. For example, the associated reference segments may be determined by comparing a time-dependent e.g. weekly probe profile for the segment to the corresponding probe profiles for the reference segments. The subset of reference segments may be selected based on the similarity of their probe profile to that of the non-reference segment. For example, the most similar reference segment may be selected, or a similarity value may be assigned to each reference segment, with those reference segments having a similarity value above a predetermined value, or a predefined number of the most similar reference segments etc. being selected.

The selection of the reference segments for inclusion in the subset may alternatively or additionally be based upon the proximity of the reference segment to the non-reference segment for which traffic volume data is required. The proximity may be a spatial or temporal proximity, such as a straight line distance or distance through the navigable network between the reference and non-reference segments, in terms of travel time or spatial distance. For example, only reference segment(s) within a predetermined distance or travel time may be considered, or only a predefined number of closest reference segments etc.

Alternatively or additionally the selection may be based upon a similarity of properties of the reference and non-reference segments e.g. by consideration of Functional Road Class.

Any of these techniques may be used alone or in any combination and may enable a set of one or more reference segments which are relevant to the non-reference segment of interest to be identified. This may assist in obtaining an estimated scaling coefficient for the non-reference segment which is relevant to the segment and more accurate.

This step of identifying a subset of reference segments, which may be a single reference segment or a plurality thereof, may be performed prior to the previously described steps of determining an estimated scaling coefficient based on multiple reference scaling coefficients. Thus, the determination of the estimated scaling coefficient may be based on multiple reference scaling coefficients, and may involve weighting contributions from multiple reference scaling coefficients e.g. based upon similarity of probe profiles, and/or proximity of the associated reference segments and the non-reference segment, and/or any other criteria, as above described.

From a broad aspect, it will be appreciated that the described embodiments enable traffic volume to be determined for a segment for which absolute vehicle count data does not exist (at least for a given time of interest) using reference scaling coefficients associated with one or more reference segments for which such absolute vehicle count data does exist.

The skilled person will appreciated that an apparatus provided to execute a method as described herein may comprise hardware, software, firmware or any combination of two or more of these.

The skilled person will appreciate that, whilst the term GPS data has been used to refer to positioning data derived from a GPS global positioning system. Other positioning data could be processed in a manner similar to the methods as described herein. Thus, term GPS data may be replaceable with the phrase positioning data.

All of the features disclosed in this specification, and/or all of the steps of any method or process so disclosed, may be combined in any combination, except combinations where at least some of such features and/or steps are mutually exclusive.

Each feature disclosed in this specification, may be replaced by alternative features serving the same, equivalent or similar purpose, unless expressly stated otherwise. Thus, unless expressly stated otherwise, each feature disclosed is one example only of a generic series of equivalent or similar features.

The described embodiments are not restricted to the details of any foregoing embodiments. The embodiments extend to any novel one, or any novel combination, of the features disclosed in this specification, or to any novel one, or any novel combination, of the steps of any method or process so disclosed. The claims should not be construed to cover merely the foregoing embodiments, but also any embodiments which fall within the scope of the claims.

What is claimed is:

1. A method for estimating a traffic volume in respect of a given time for a given segment of an electronic map representing a navigable network in an area, the electronic map comprising a plurality of segments representing navigable elements of the navigable network in the area, the method comprising:

estimating the traffic volume using data indicative of a count of devices associated with vehicles traversing at least a portion of a stretch of the navigable network represented by the given segment in respect of the given time and an estimated scaling coefficient for the given time for the given segment, the devices including position-determining capabilities, wherein:

the estimated scaling coefficient for the given segment is based on a reference scaling coefficient associated with each one of a subset of one or more reference segments of the electronic map, the reference segments from among the one or more reference segments being associated with the given segment based on one or more properties of the one or more reference segments and the given segment, each reference segment being associated with data indicative of a respective reference scaling coefficient for the given time, the respective reference scaling coefficient being based on:
- a measured count of vehicles traversing at least a portion of a stretch of the navigable network represented by the reference segment in respect of the given time; and
- a count of devices associated with vehicles traversing the at least the portion of the stretch of the navigable network represented by the reference segment in respect of the given time;

the data indicative of the count of devices associated with the vehicles traversing the at least the portion of the stretch of the navigable network represented by the given segment being based on positional data and associated timing data relating to the movement of a plurality of devices with respect to time along the at least the portion of the stretch of the navigable network represented by the given segment;

generating data indicative of the estimated traffic volume for the given segment in respect of the given time; and using the data indicative of the estimated traffic volume for performing one or more operations for which traffic volume is an input.

2. The method of claim 1, wherein the reference scaling coefficient for the given time associated with each reference segment is based on a ratio of:
the measured count of the vehicles traversing the at least the portion of the stretch of the navigable network represented by that reference segment for the given time; and
the count of devices associated with vehicles traversing the at least the portion of the stretch of the navigable network represented by that reference segment in respect of the given time.

3. The method of claim 1, wherein each reference segment is associated with data indicative of a time-dependent reference scaling coefficient profile, wherein the reference scaling coefficient profile is indicative of a variation in the reference scaling coefficient for the reference segment with respect to time.

4. The method of claim 3, wherein the reference scaling coefficient profile is based at least in part on a probe profile indicative of a variation in the count of devices associated with vehicles traversing the at least the portion of the stretch of the navigable network represented by the reference segment over time as determined based on positional data and associated timing data relating to the movement of a plurality of devices associated with vehicles along the at least the portion of the stretch of the navigable network represented by the reference segment.

5. The method of claim 1, wherein the given time is a current time and the reference scaling coefficient is based at least in part on live data.

6. The method of claim 1, wherein the electronic map further comprises, for each segment that is not a reference segment, data indicative of the subset of one or more reference segments of the electronic map associated with the segment.

7. The method of claim 1, further comprising determining the subset of the one or more of the reference segments which are associated with the given segment and storing data indicative of the subset of the one or more of the reference segments which are associated with the given segment.

8. The method of claim 7, wherein:
the subset of one or more reference segments is determined at least in part based on a comparison of a probe profile associated with the given segment to reference probe profiles associated with one or more reference segments from among the reference segments of the electronic map;
the probe profile is indicative of a variation in a count of devices associated with vehicles traversing the at least the portion of the stretch of the navigable network represented by the given segment with respect to time as determined based on positional data and associated timing data relating to the movement of a plurality of devices associated with vehicles traversing the at least the portion of the stretch of the navigable network represented by the given segment; and
the reference probe profile is indicative of a variation in a count of devices associated with vehicles traversing the at least the portion of the stretch of the navigable network represented by the reference segment with respect to time as determined based on positional data and associated timing data relating to the movement of a plurality of devices associated with vehicles traversing the at least the portion of the stretch of the navigable network represented by the reference segment.

9. The method of claim 8, wherein the subset of one or more reference segments comprise one or more reference segments having reference probe profiles determined to have a specified similarity with the probe profile of the given segment.

10. The method of claim 7, wherein the subset of one or more reference segments is determined based at least in part on a proximity of reference segments among the one or more of the reference segments to a position of the given segment within the navigable network.

11. The method of claim 7, wherein the subset of one or more reference segments is determined based at least in part on one or more properties of reference segments among the one or more of the reference segments having a specified similarity to one or more properties of the given segment.

12. The method of claim 1, wherein:
the estimated scaling coefficient for the given segment is estimated using data indicative of a similarity of a probe profile associated with the given segment to each one of a set of one or more reference probe profiles, each reference probe profile being associated with a respective one of the one or more reference segments whose reference scaling coefficient is used in determining the estimated scaling coefficient;
the probe profile is indicative of a variation in a count of devices associated with vehicles traversing the at least the portion of the stretch of the navigable network represented by the given segment with respect to time as determined based on positional data and associated timing data relating to a movement of a plurality of devices associated with vehicles traversing the at least the portion of the stretch of the navigable network represented by the given segment; and
the reference probe profile is indicative of a variation in a count of devices associated with vehicles traversing the at least the portion of the stretch of the navigable network represented by the reference segment with respect to time as determined based on positional data and associated timing data relating to a movement of a plurality of devices associated with vehicles traversing the at least the portion of the stretch of the navigable network represented by the reference segment.

13. The method of claim 12, wherein:
the estimated scaling coefficient for the given segment is based on a plurality of the reference scaling coefficients; and
a contribution of a given reference scaling coefficient to the estimated scaling coefficient for the given segment is based at least in part on a similarity of:
the reference probe profile associated with the reference segment with which the reference scaling coefficient is associated, and
the probe profile associated with the given segment.

14. The method of claim 1, wherein:
the estimated scaling coefficient for the given segment is based on a plurality of the reference scaling coefficients; and
a contribution of each reference scaling coefficient from among the plurality of the reference scaling coefficients to the estimated scaling coefficient is based at least in part on a proximity of the reference segment associated with the reference scaling coefficient to the given segment within the navigable network.

15. The method of claim 1, wherein the estimated scaling coefficient is based upon a weighted sum of a plurality of reference scaling coefficients.

16. The method of claim 15, wherein data indicative of a set of weighting values for use in obtaining the weighted sum of the plurality of reference scaling coefficients is obtained using a linear regression training model.

17. The method of claim 16, wherein the linear regression training model uses data indicative of a measured count of vehicles traversing the at least the portion of the stretch of the navigable network represented by the reference segment in respect of the given time as determined based on data measured by at least one traffic detector associated with the portion of the stretch of the navigable network represented by the reference segment.

18. The method of claim 1, further comprising receiving data indicative of the given segment and data indicative of a time of interest and using the data indicative of the time of interest to identify the given time.

19. The method of claim 1, wherein the given time is a current time or a future time.

20. The method of claim 1, wherein the given time is a time interval during at least one day of the week.

21. The method of claim 1, further comprising associating, in the electronic map, the data indicative of the estimated traffic volume with data indicative of the given segment.

22. The method of claim 1, further comprising:
storing the estimated traffic volume and/or a traffic density based on the estimated traffic volume; and
displaying the estimated traffic volume and/or the traffic density to a user.

23. A system for estimating a traffic volume in respect of a given time for a given segment of an electronic map representing a navigable network in an area, the electronic map comprising a plurality of segments representing navigable elements of the navigable network in the area, the system comprising one or more processors configured to:
estimate the traffic volume using data indicative of a count of devices associated with vehicles traversing at least a portion of a stretch of the navigable network represented by the given segment in respect of the given time and an estimated scaling coefficient for the given time for the given segment, the devices including position-determining capabilities, wherein:
the estimated scaling coefficient for the given segment is based on a reference scaling coefficient associated with each one of a subset of one or more reference segments of the electronic map, the reference segments from among the one or more reference segments being associated with the given segment based on one or more properties of the one or more reference segments and the given segment, each reference segment being associated with data indicative of a respective reference scaling coefficient for the given time, the respective reference scaling coefficient being based on:
a measured count of vehicles traversing at least a portion of a stretch of the navigable network represented by the reference segment in respect of the given time; and
a count of devices associated with vehicles traversing the at least the portion of the stretch of the navigable network represented by the reference segment in respect of the given time;
the data indicative of the count of devices associated with the vehicles traversing the at least the portion of the stretch of the navigable network represented by the given segment is based on positional data and associated timing data relating to the movement of a plurality of devices with respect to time along the at least the portion of the stretch of the navigable network represented by the given segment;
generate data indicative of the estimated traffic volume for the given segment in respect of the given time; and
use the data indicative of the estimated traffic volume for performing one or more operations for which traffic volume is an input.

24. A non-transitory computer readable storage medium storing instructions which, when executed by one or more processors of a system, cause the one or more processors to perform a method for estimating a traffic volume in respect of a given time for a given segment of an electronic map representing a navigable network in an area, the electronic map comprising a plurality of segments representing navigable elements of the navigable network in the area, the method comprising:
estimating the traffic volume using data indicative of a count of devices associated with vehicles traversing at least a portion of a stretch of the navigable network represented by the given segment in respect of the given time and an estimated scaling coefficient for the given time for the given segment, the devices including position-determining capabilities, wherein:
the estimated scaling coefficient for the given segment is based on a reference scaling coefficient associated with each one of a subset of one or more reference segments of the electronic map, the reference segments from among the one or more reference segments being associated with the given segment based on one or more properties of the one or more reference segments and the given segment, each reference segment being associated with data indicative of a respective reference scaling coefficient for the given time, the respective reference scaling coefficient being based on:
a measured count of vehicles traversing at least a portion of a stretch of the navigable network represented by the reference segment in respect of the given time; and
a count of devices associated with vehicles traversing the at least the portion of the stretch of the navigable network represented by the reference segment in respect of the given time;

the data indicative of the count of devices associated with the vehicles traversing the at least the portion of the stretch of the navigable network represented by the given segment is based on positional data and associated timing data relating to the movement of a plurality of devices with respect to time along the at least the portion of the stretch of the navigable network represented by the given segment;

generating data indicative of the estimated traffic volume for the given segment in respect of the given time; and using the data indicative of the estimated traffic volume for performing one or more operations for which traffic volume is an input.

25. The method of claim 1, wherein:

each reference segment is a segment representing at least a portion of a navigable stretch of the navigable network which is associated with at least one traffic detector; and the given segment is a segment representing at least a portion of a navigable stretch of the navigable network which is not associated with a traffic detector.

26. The method of claim 25, wherein:

the measured count of vehicles traversing the at least the portion of the stretch of the navigable network represented by each reference segment is based on data measured by at least one traffic detector associated with the portion of the stretch of the navigable network represented by each reference segment; and the count of devices associated with vehicles is based on positional data and associated timing data relating to the movement of a plurality of devices along the at least the portion of the stretch of the navigable network represented by each reference segment.

27. The method of claim 1, wherein the one or more operations for which traffic volume is an input include:

generating, based at least in part on the data indicative of the estimated traffic volume, instructions for guiding a user along a navigation route; and outputting the instructions to the user as the user proceeds along the navigation route.

28. The method of claim 1, wherein the one or more operations for which traffic volume is an input include:

generating, based at least in part on the data indicative of the estimated traffic volume, information about traffic flow in the navigable network; and presenting at least one representation of traffic flow in the network that includes the information about the traffic flow in the navigable network.

* * * * *